United States Patent
Yasuda

(10) Patent No.: US 12,511,669 B2
(45) Date of Patent: Dec. 30, 2025

(54) PROJECTION PROCESSING DEVICE, STORAGE MEDIUM, AND PROJECTION METHOD

(71) Applicant: CASIO COMPUTER CO., LTD., Tokyo (JP)

(72) Inventor: Naohiko Yasuda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 350 days.

(21) Appl. No.: 17/948,417

(22) Filed: Sep. 20, 2022

(65) Prior Publication Data

US 2023/0090233 A1  Mar. 23, 2023

(30) Foreign Application Priority Data

Sep. 22, 2021  (JP) ................. 2021-154005

(51) Int. Cl.
*G06Q 30/02* (2023.01)
*G06T 7/70* (2017.01)
(Continued)

(52) U.S. Cl.
CPC .......... *G06Q 30/0281* (2013.01); *G06T 7/70* (2017.01); *G06T 2207/30196* (2013.01); *G06V 40/10* (2022.01); *H04N 9/3179* (2013.01)

(58) Field of Classification Search
CPC .... G06Q 30/0281; G06Q 30/06; G06Q 50/12; G06T 7/70; G06T 2207/30196;
(Continued)

(56) References Cited

U.S. PATENT DOCUMENTS

| | | | |
|---|---|---|---|
| 2015/0317835 A1* | 11/2015 | Byers | H04L 67/52 345/633 |
| 2017/0364836 A1* | 12/2017 | Li | G06Q 20/102 |
| 2020/0284416 A1* | 9/2020 | Greiner | F21V 23/0478 |

FOREIGN PATENT DOCUMENTS

| | | | |
|---|---|---|---|
| CN | 106447544 A | * | 2/2017 |
| JP | 2006011346 A | | 1/2006 |

(Continued)

OTHER PUBLICATIONS

Klimek, Radosław, Sensor-Enabled Context-Aware and Pro-Active Queue Management Systems in Intelligent Environments. Jul. 31, 2020. Aug. 22, 2025 <https://www.mdpi.com/1424-8220/20/20/5837> Included "Article Version Notes" with additional dates. (Year: 2020).*

(Continued)

*Primary Examiner* — Lynda Jasmin
*Assistant Examiner* — Shaun D Sensenig
(74) *Attorney, Agent, or Firm* — Scully, Scott, Murphy & Presser, P.C.

(57) ABSTRACT

Provided are a projection processing device, a storage medium, and a projection method that can realize efficient guidance of customers who receive services. A projection processing device 10 includes a processor 20 that executes projection processing for acquiring a number of available servings of a service and projecting a notification image 50 used to notify information on the number of available servings. Further, the processor 20 is capable of changing display contents of notification images 50 and 51 for each kind of the service, and changing display contents of notification images 50, 50a, and 50b according to the number of available servings.

18 Claims, 20 Drawing Sheets

(51) Int. Cl.
*G06V 40/10* (2022.01)
*H04N 9/31* (2006.01)

(58) Field of Classification Search
CPC ...... G06V 40/10; G06V 20/52; H04N 9/3179; H04N 9/3194; G07C 2011/04; G03B 17/54; G03B 21/00–64
See application file for complete search history.

(56) References Cited

FOREIGN PATENT DOCUMENTS

| | | | | |
|---|---|---|---|---|
| JP | 2011100316 A | * | 5/2011 | |
| JP | 2012108282 A | | 6/2012 | |
| JP | 2018185414 A | | 11/2018 | |
| JP | 2019023808 A | * | 2/2019 | |
| JP | 2020112866 A | * | 7/2020 | |
| JP | 2021109731 A | | 8/2021 | |
| WO | WO-2014052882 A2 | * | 4/2014 | ........... G06Q 20/145 |

OTHER PUBLICATIONS

Notice of Reasons for Refusal dated Sep. 26, 2023 received in Japanese Patent Application No. JP 2021-154005.

* cited by examiner

PROJECTION PROCESSING DEVICE, STORAGE MEDIUM, AND PROJECTION METHOD This application is based on and claims the benefit of priority from Japanese Patent Application No. 2021-154005, filed on 22 Sep. 2021, the content of which is incorporated herein by reference.

BACKGROUND OF THE INVENTION

Field of the Invention

The present disclosure relates to a projection processing device, a storage medium, and a projection method.

Related Art

In the related art, techniques related to a projection device have been known that project an image not only on a screen but also on a wall and an empty region. For example, when a projection device is used at a store such as a restaurant, contents of a service can be delivered to customers in an easy-to-understand manner. However, even when customers are lined up at the store with a small number of remaining dishes, some customers will not be able to receive the service and will be waiting in vain. It is difficult for the customers to grasp the number of available servings of a service that can be provided to the customers from the store, and there is room for improvement in that the service is provided to the customers according to the number of available servings.

A projection processing device according to an aspect of the present disclosure includes a processing unit that executes projection processing for acquiring a number of available servings of a service, setting a notification image for notifying information on the number of available servings, and projecting the notification image.

DETAILED DESCRIPTION OF THE INVENTION

<Projection System>

First, an outline of a projection system 1 according to the present embodiment will be described. It should be noted that the system in the present embodiment includes not only all devices configured by a plurality of devices and a plurality of units but also a single device.

Figure 1:
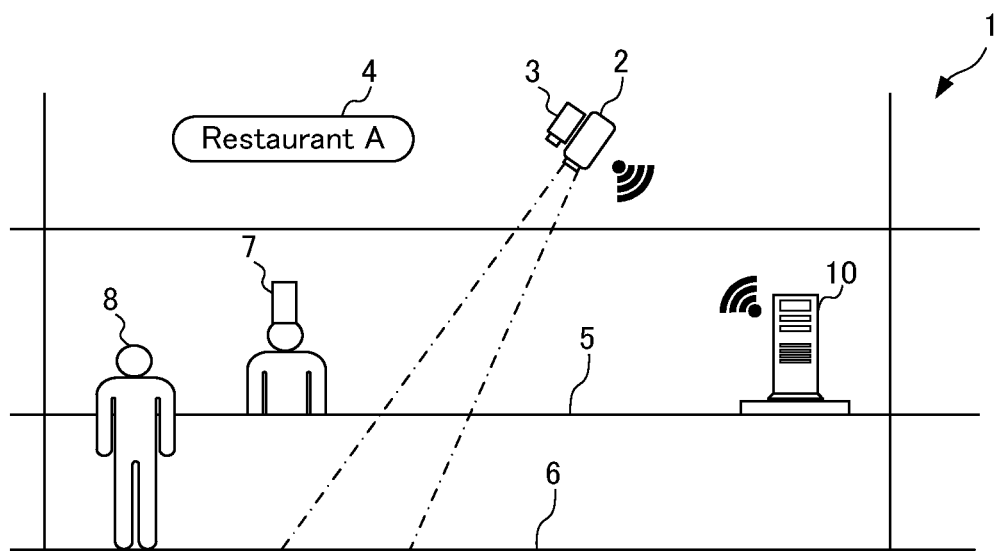
FIG. 1 is a schematic diagram showing a projection system according to an embodiment of the present disclosure.

FIG. 1 is a schematic diagram showing a projection system 1 according to an embodiment of the present disclosure. FIG. 1 shows a part of a cafeteria provided on a floor in a building. In the following description, a case will be described in which a meal is provided in a restaurant A provided in the cafeteria (hereinafter, referred to as a store 4). At the store 4, a service provider 7 in a counter 5 provides a meal according to an order from a user 8. However, services other than the meal may be provided at the store 4. For example, the services provided at the store 4 may include selling of products such as drinks and food, selling of tickets for movies or concerts, or haircuts and massages for the user 8.

The projection system 1 of the present embodiment includes a projection device 2 installed near a ceiling of a place (counter 5) for receiving meals from the service provider 7 at the store 4, an image capturing device 3 that captures surrounding images of the counter 5 for receiving the meals from the service provider 7 at the store 4, and a projection processing device 10 that communicates data with the projection device 2 and the image capturing device 3 by wireless communication such as Wi-Fi (registered trademark) or wired communication.

In the example of FIG. 1, the projection device 2, the image capturing device 3, and the projection processing device 10 are separately configured, but are not limited to such a configuration. For example, the projection device 2 may be configured to embed the image capturing device 3, or the projection device 2 may be configured to embed the projection processing device 10. Further, the projection device 2, the image capturing device 3, and the projection processing device 10 may be housed in one housing. In FIG. 1, the projection device 2 and the image capturing device 3 are separately configured for convenience of description, but in the following description, it is assumed that the image capturing device 3 is embedded in the projection device 2 to operate.

The projection processing device 10 is a general-purpose computer capable of executing various functions by installing various programs. However, the present invention is not limited thereto, a computer incorporated in dedicated hardware may be used. The projection processing device 10 acquires a quantity of meals capable of being served at the store 4 (hereinafter, referred to as the number of available servings) and an image displayed on the outside of the counter 5 that receives the meals from the service provider 7 at the store 4 (on a side on which the user 8 is standing. hereinafter, referred to as a service receipt side). Examples of a method of acquiring the quantity of meals and the image include inputting the number of available servings through a keyboard (not shown) in the projection processing device 10 by the employee at the store 4 and using an image stored in advance in a memory (for example, an HDD or a flash memory) embedded in the projection processing device 10.

The projection device 2 projects as many images as the acquired number of available servings to the floor 6 on the service receipt side at the counter 5 of the store 4 as an image for notifying that the service can be provided. The image capturing device 3 captures an image of the surroundings of the service receipt side at the counter 5 of the store 4 under the control of the projection device 2.

Figure 2:
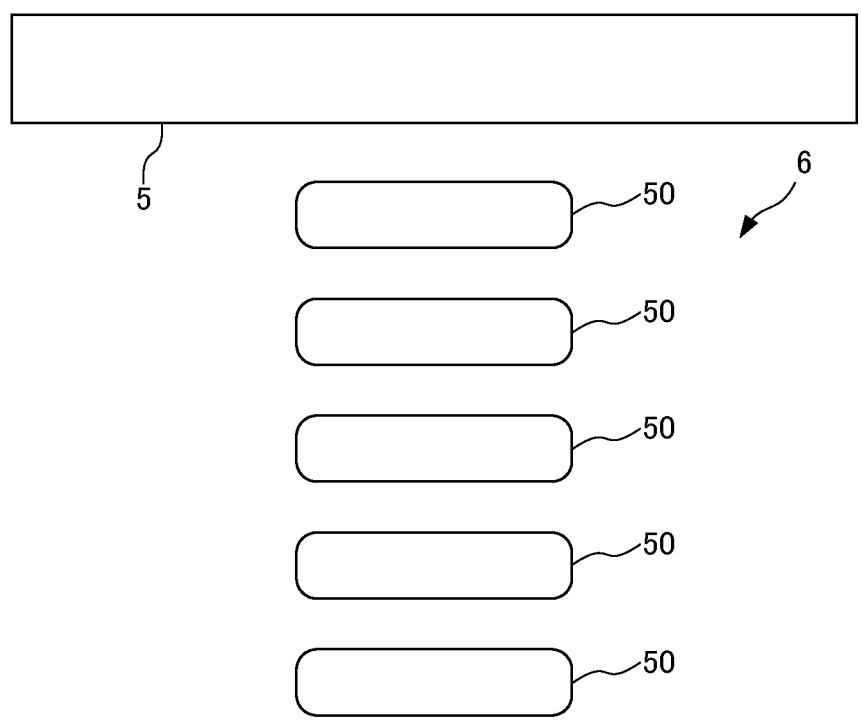
FIG. 2 is a schematic diagram showing an example of a notification image projected on a floor on a service receipt side of a counter at a store by the projection device according to the present embodiment.
Figure 3:
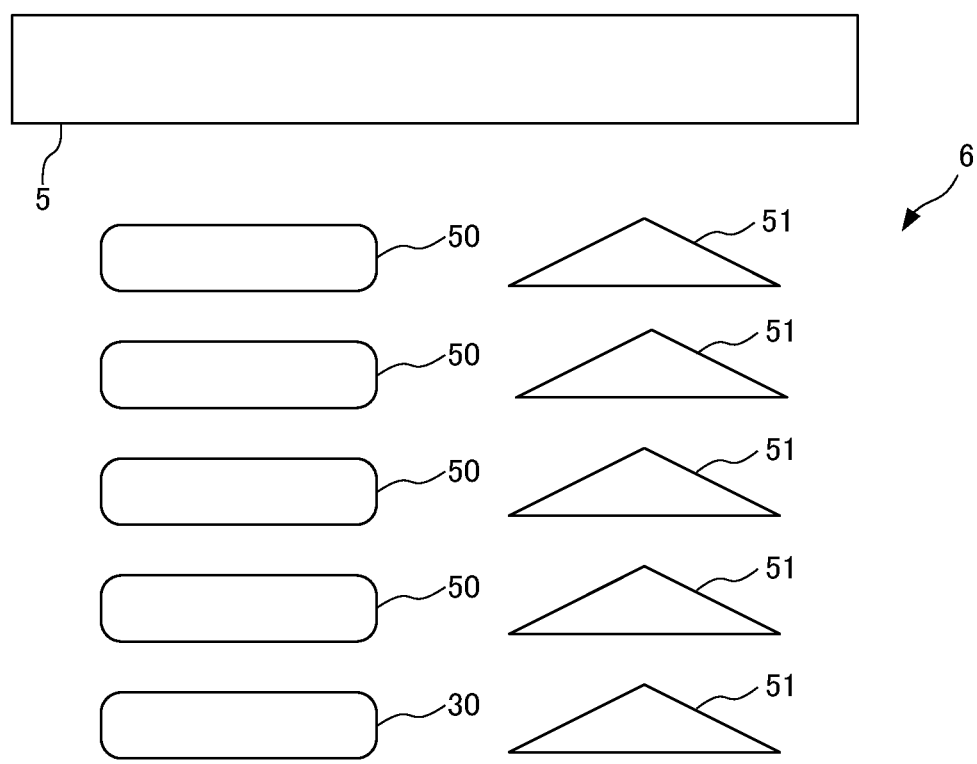
FIG. 3 is a schematic diagram showing an example of a notification image projected on the floor on the service receipt side of the counter at the store by the projection device according to the present embodiment.

FIGS. 2 and 3 are schematic diagrams showing examples of notification images 50 projected on the service receipt side of the store 4 by the projection device 2 of the present embodiment. FIGS. 2 and 3 show examples in which the notification images 50 are displayed on the floor 6 on the service receipt side at the counter 5 of the store 4 by the projection device 2 in a plan view. In FIGS. 2 and 3, the user 8 is not shown.

In the example of FIG. 2, a case is shown in which the projection device 2 acquires the number of available servings corresponding to one dish from the projection processing device 10. In this case, the projection device 2 projects the notification images 50 having a corner-rounded rectangle indicating that the service can be provided. The number of notification images 50 matches, for example, the number of available servings of an A set meal that can be provided by the store 4 (that is, matches the number of available servings), and the notification images 50 having the corner-rounded rectangle correspond to the A set meals provided by the store 4. Therefore, the user 8 knows that the store 4 can provide 5 sets of A set meals. Further, since only one type of image of the notification image 50 is projected, the user 8 can know that the number of dishes is one that can be provided by the store 4. Here, the term dish indicates one dish (set meal, curry rice, ramen, or the like) among the dish choices provided by the store 4.

In the example of FIG. 3, a case is shown in which the projection device 2 acquires the number of available servings corresponding to two dishes from the projection processing device 10. In this case, the projection device 2 projects two types of notification images 50 and 51. The notification image 50 having a corner-rounded rectangle corresponds to the A set meal as in the example of FIG. 2. Since the notification image 51 having an isosceles triangle is different in shape from the notification image 50, it can be seen that the dish is different from the A set meal indicated by the notification image 50 having the corner-rounded rectangle. In this example, the notification image 51 having the isosceles triangle corresponds to, for example, curry rice, which is a dish different from the A set meal provided by the store 4. In other words, the number of notification images 51 matches the number of available servings of curry rice. Therefore, it can be seen that the store 4 can provide 5 sets of A set meals and 5 sets of curry rice.

<Configuration of Projection Processing Device>

Figure 4:
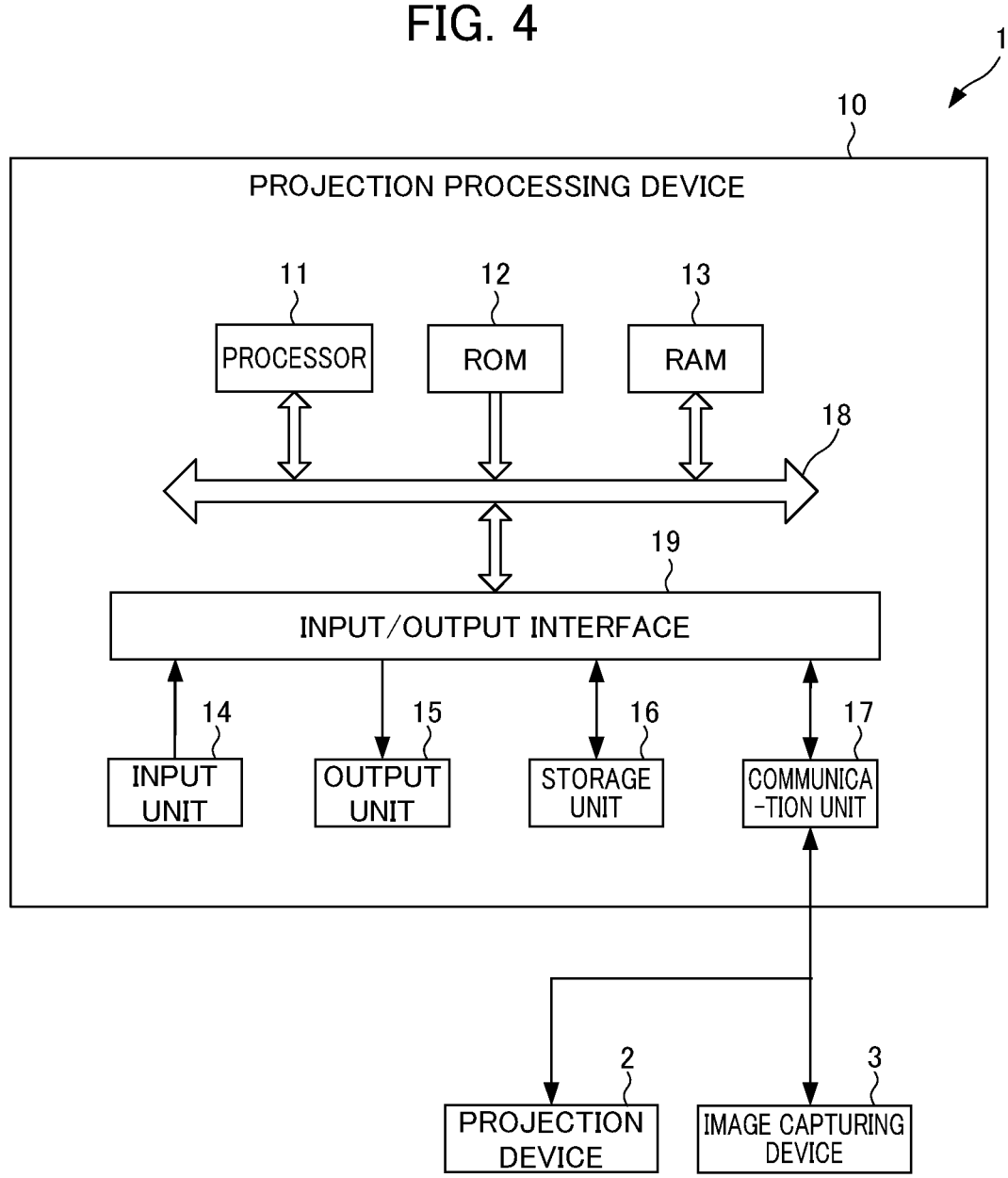
FIG. 4 is a block diagram showing a hardware configuration of the projection system according to the present embodiment.

Next, the configuration of the projection processing device 10 will be described that realizes the projection system 1. FIG. 4 is a block diagram showing a configuration of hardware of the projection processing device 10 according to the embodiment of the present disclosure. As shown in FIG. 4, the projection processing device 10 includes a processor 11, a ROM (Read Only Memory) 12, a RAM (Random Access Memory) 13, an input unit 14, an output unit 15, a storage unit 16, a communication unit 17, a bus 18, and an input/output interface 19.

The processor 11 is a central part of a computer that performs arithmetic operation processing and control processing necessary for the operation of the projection processing device 10, and performs various arithmetic operation processing and control processing. The processor 11 is, for example, a CPU (Central Processing Unit), an MPU (Micro Processing Unit), a SoC (System on a Chip), a DSP (Digital Signal Processor), a GPU (Graphics Processing Unit), an ASIC (Application Specific Integrated Circuit), a PLD (Programmable Logic Device), or an FPGA (Field-Programmable Gate Array). Alternatively, the processor 11 is a combination of a plurality of these. Further, the processor 11 may be a combination of these with a hardware accelerator.

The processor 11 controls each unit to realize various functions of the projection processing device 10 based on programs such as firmware, system software and application software stored in the ROM 12 or the RAM 13. Further, the processor 11 executes processing to be described below based on the programs. Some or all of the programs may be incorporated in a circuit of the processor 11.

The processor 11, the ROM 12, and the RAM 13 are connected to each other via the bus 18. The input/output interface 19 is also connected to the bus 18. The input/output interface 19 is connected with the input unit 14, the output unit 15, the storage unit 16, and the communication unit 17.

The input unit 14 and the output unit 15 are user interfaces that are electrically connected to the input/output interface 19 in a wired manner or a wireless manner. The input unit 14 is configured by, for example, a keyboard, a mouse, various buttons, and a microphone, and inputs various information according to an instruction operation of a user. The output unit 15 is configured by, for example, a display for displaying an image and a speaker for making a sound loud, and outputs an image and a sound.

The storage unit 16 is configured by a semiconductor memory such as a DRAM (Dynamic Random Access Memory), and stores various data tables and image data related to image correction processing.

The communication unit 17 is a device for communicating with the projection device 2, the image capturing device 3, and another device (not shown) via a network including the Internet.

The projection device 2 and the image capturing device 3 of the present embodiment are remotely controlled by the projection processing device 10 using wireless communication or wired communication. The projection device 2 and the projection processing device 10 communicate with each other via, for example, the Internet, a LAN (Local Area Network), any one of mobile phone networks, or a network in which these are combined. The communication unit 17 may be a device for performing short-range communication without going through the network.

Figure 5:
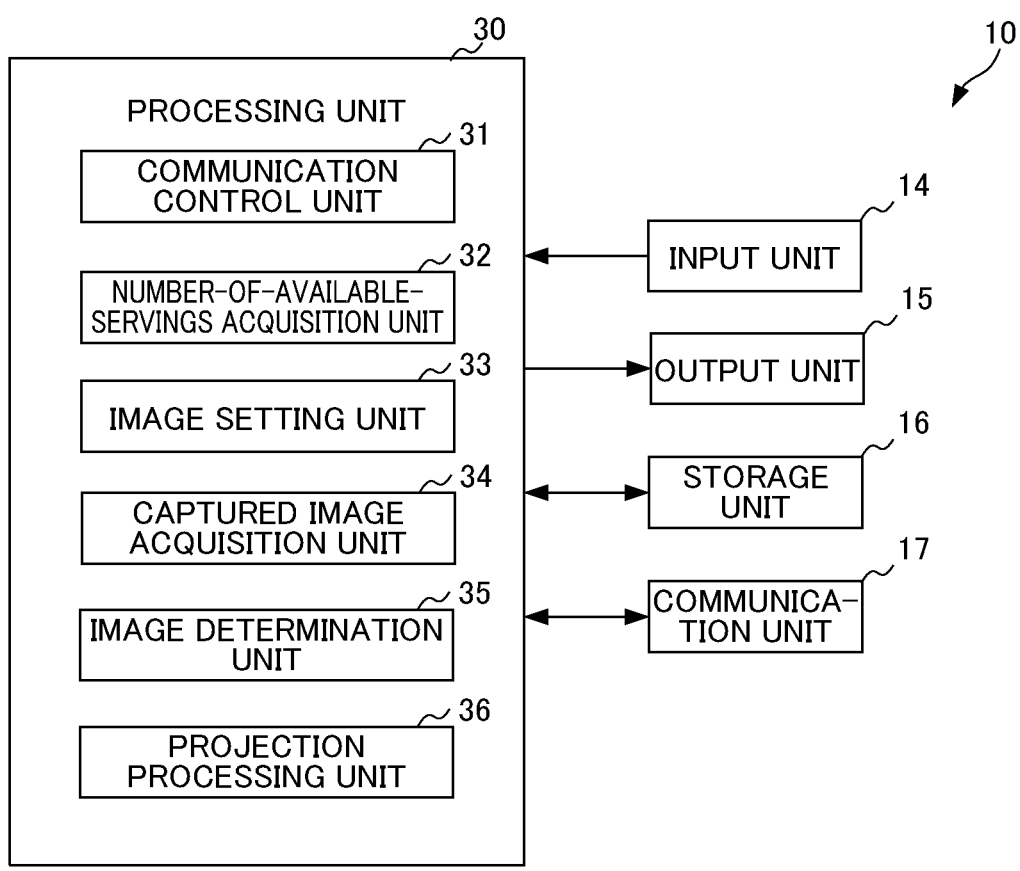
FIG. 5 is a functional block diagram showing functional components for performing projection processing among functional components of a projection processing device according to the present embodiment.

Next, a functional configuration of the projection processing device 10 will be described. FIG. 5 is a functional block diagram showing the functional configuration for performing projection processing in the functional configuration of the projection processing device 10 of the present embodiment. A processing unit 30 configurated to perform various controls of the projection processing device 10 is realized by the processor 11 that executes the arithmetic operation processing. The processing unit 30 may also be referred to as the processor 11.

The processing unit 30 of the present embodiment includes a communication control unit (communication control function) 31, a number-of-available-servings acquisition unit (acquisition function) 32, an image setting unit (image setting function) 33, a captured image acquisition unit (captured image acquisition function) 34, an image determination unit (image determination function) 35, and a projection processing unit (projection processing function) 36.

The communication control unit 31 executes processing for communicating with an external device via the communication unit 17. For example, the communication control unit 31 executes processing for transmitting and receiving various information to and from the projection device 2 and the image capturing device 3 via the communication unit 17.

The number-of-available-servings acquisition unit 32 executes processing for acquiring the number of available servings for a service (A set meal, curry rice in the example of FIG. 3) that can be provided to the user 8 at the store 4. The number-of-available-servings acquisition unit 32 acquires, for example, the number of available servings for each service content from an ordering system (not shown) in the store 4 via the communication unit 17. Further, the number-of-available-servings acquisition unit 32 acquires the number of available servings input to an employee in the store 4 via the input unit 14. In this way, the number of available servings can be acquired by various methods.

The image setting unit 33 executes processing for setting display contents of the notification images 50 and 51 to be projected. The notification images 50 and 51 set by the image setting unit 33 are projected by the projection device 2. The processing for setting the display contents by the image setting unit 33 will be described below.

The captured image acquisition unit 34 acquires the captured image that is captured by the image capturing device 3. The captured image may constitute a moving image in which images captured by the image capturing device 3 at a predetermined frame rate are continuous. In the present embodiment, since an image capturing range of the image capturing device 3 is set to include notification images 50 and 51 projected on the floor 6 on the service receipt side of the counter 5 at the store 4, the captured image includes the notification images 50 and 51.

The image determination unit 35 executes processing for analyzing a situation on the service receipt side of the counter 5 at the store 4 with respect to the captured image captured by the captured image acquisition unit 34. The image determination unit 35 determines by image processing whether a person is within the captured image.

The projection processing unit 36 executes processing in which the projection device 2 projects an image. The projection processing unit 36 projects the notification image 50 set by the image setting unit 33. In the embodiment described above, the notification image 50 is projected onto the floor 6 on the receipt side of the counter 5 at the store 4 by the projection processing unit 36. A projection position of the notification image 50 can also be changed as appropriate. For example, the projection position may be a part of a building such as a wall other than the floor 6, or a screen may be prepared.

<Projection Processing>

Figure 6:
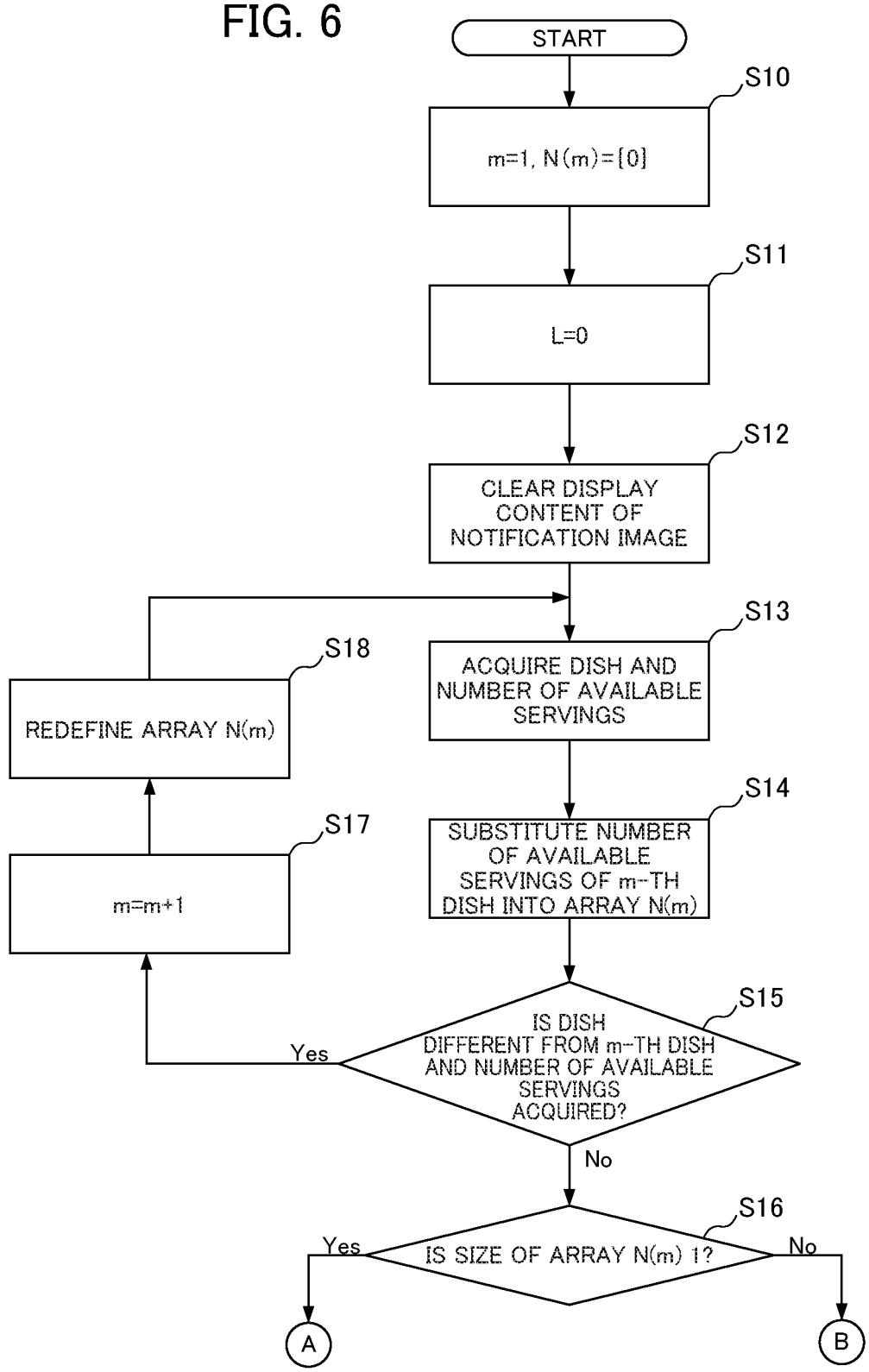
FIG. 6 is a flowchart for describing a former half of a flow of the projection processing executed by the projection processing device according to the present embodiment.
Figure 7:
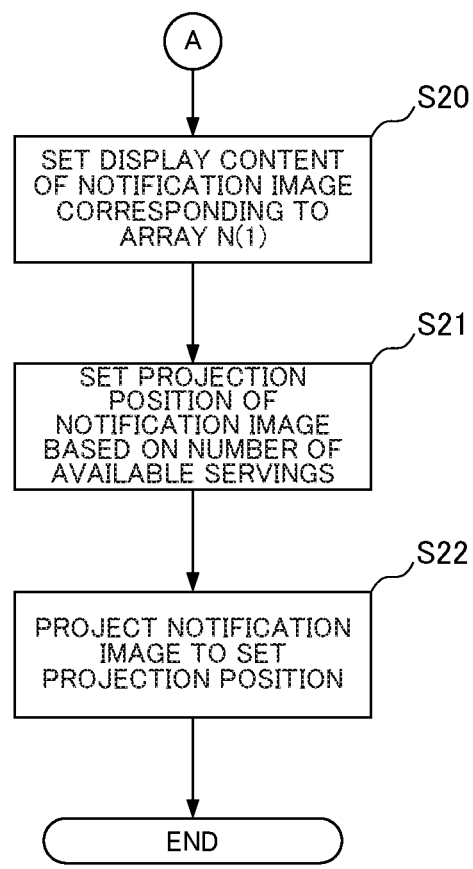
FIG. 7 is a flowchart for describing a latter half of the flow of the projection processing executed by the projection processing device according to the present embodiment.
Figure 8:
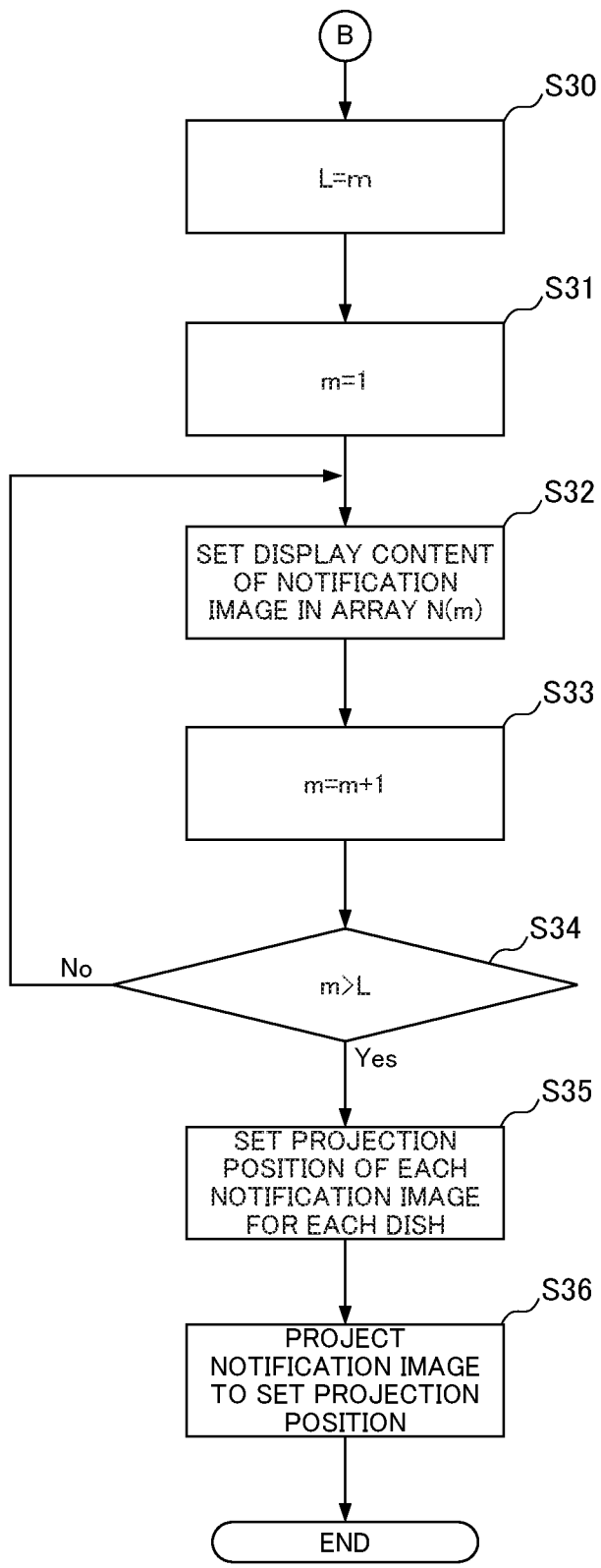
FIG. 8 is a flowchart for describing a latter half of the flow of the projection processing executed by the projection processing device according to the present embodiment.

An example of projection processing will be described with reference to FIGS. 6 to 8. Each of FIGS. 6 to 8 is an example of a flowchart for describing a flow of projection processing executed by the projection processing device 10 of the present embodiment.

The image setting unit 33 of the processing unit 30 defines an array in which "m=1, N(m)={0} (step S10). It is assumed that N represents a one-dimensional array and the array N is an array of which element number starts from 1. In these flowcharts, m represents the number of dishes. In the case of FIG. 3, since the dishes are the A set meal and the curry rice, the number of dishes is 2. In step S10, a value of an array N(1) is substituted by 0. Next, in the flowchart to be described below, when the image projected from the projection device 2 has a plurality of types of shapes (the notification image 50 having the corner-rounded rectangle and the notification image 51 having the isosceles triangle in FIG. 3), the processing unit 30 defines L as a variable used to retain (buffer) the set value and substitutes 0 as a value of the variable L (step S11).

Next, the image setting unit 33 clears the display contents of the notification images 50 and 51 stored in the memory such as the RAM 13 (step S12). The display contents include, for example, shapes and colors of the notification images 50 and 51.

After step S12, the number-of-available-servings acquisition unit 32 acquires the dish and the number of available servings of the dish (step S13). The number-of-available-servings acquisition unit 32 acquires a dish, for example, "A set meal, 5 servings" and information indicating the number of available servings of the dish.

The number-of-available-servings acquisition unit 32 substitutes the number of available servings of m-th dish into the array N(m) (step S14). Specifically, since m is set to 1 in step S10 and the number-of-available-servings acquisition unit 32 acquires "A set meal, 5 servings", the number of available servings of the A set meal, which is the first dish, is substituted into the array N(1) as 5 in step S14.

Next, the number-of-available-servings acquisition unit 32 determines whether a dish different from the m-th dish and the number of available servings corresponding to such a dish are acquired (step S15). Specifically, since the A set meal is acquired as the first dish, the number-of-available-servings acquisition unit 32 determines whether a dish different from the A set meal as the first dish and the number of available servings corresponding to such a dish are acquired.

When the number-of-available-servings acquisition unit 32 determines that the dish different from the m-th dish and the number of available servings corresponding to such a dish are acquired (Yes in step S15), the number-of-available-servings acquisition unit 32 executes increment processing of "m=m+1" (step S17). Specifically, since m=1, m=2. Next, the image setting unit 33 redefines the array N(m) (step S18). Specifically, the redefinition of the array N(2) means that the size of the array N is incremented by 1. In other words, it means that the number of elements in the array N is incremented from 1 to 2. In the redefinition of the array N(2), when the value of N(1) is set to 5, a state is held where the value of N(1) is 5.

The image setting unit 33 redefines the array N(m), and then the process returns to step S13. In step S13 via step S18, a dish different from the first dish and the number of available servings corresponding to such a dish are acquired. Specifically, the number-of-available-servings acquisition unit 32 acquires "curry rice, 5 servings". Then, in step S14, the number of available servings is substituted into the array N(m). Specifically, the number of available servings of the curry rice is substituted into the array N(2) as 5.

When the number-of-available-servings acquisition unit 32 determines that the dish different from the m-th dish and the number of available servings corresponding to such a dish are not acquired (No in step S15), specifically, since only two types of dish information are received in this example, it is determined to be No in the second process of step S15. Subsequently, the image setting unit 33 determines whether the size of the array N(m) is 1 (step S16). Specifically, since the number of elements of the array N(2) is 2 in this example, the size is 2, and it is determined to be No in step S16.

When the image setting unit 33 determines that the size of the array N(m) is 1 (Yes in step S16), the process proceeds to step S20 in FIG. 7. When the image setting unit 33 determines that the size of the array N(m) is not 1 (No in step S16), the process proceeds to step S30 in FIG. 8.

A description will be given with reference to FIG. 7 with respect to a processing flow when it is determined in step S16 that the size of the array N(m) is 1. The image setting unit 33 sets display contents of the notification image 50 corresponding to the array N(1) (step S20). Specifically, the image setting unit 33 sets, for example, the shape (corner-rounded rectangle) and color of the notification image 50 as shown in FIG. 2 as the notification image 50 corresponding to the A set meal. The color of the notification image 50 in this example is set, for example, at least one of a color of a frame line representing the shape and a color of the inside of the frame (inside the frame line). These colors may be the same or different from each other.

Next, the projection processing unit 36 sets a projection position at which the notification image 50 is projected based on the number of available servings (step S21). Specifically, for example, when the number of available servings is 5, the projection processing unit 36 sets five projection positions of the notification image 50, respectively. A distance between the notification images 50 adjacent to each other is a predetermined value. Further, the distance may be a value that the employee of the store 4 inputs by operating the input unit 14 of the projection processing device 10. All of the distances between the notification images 50 adjacent to each other may be the same, or at least one thereof may be different. Further, the projection processing unit 36 acquires and analyzes an image of the surroundings on the service receipt side captured by the image capturing device 3 to detect an object (for example, a desk or a chair) placed on the floor 6 on the service receipt side. Then, the projection processing unit 36 determines whether any of the notification images 50 is projected to overlap on the object before the notification images 50 are projected, and when determining that any of the notification images 50 is projected to overlap, the projection processing unit 36 can set the positions of the notification images 50, which are projected to overlap, to non-overlapping positions, and can project the images. Depending on the change in position, the projection positions of the notification images 50 adjacent to each other may be changed. In addition, not only the projection positions of the notification images 50 adjacent to each other but also projection positions of other notification images 50 may be changed.

The projection processing unit 36 executes processing for projecting the notification image 50 to the projection position set in step S21 (step S22).

A description will be given with reference to FIG. 8 with respect to the processing flow when it is determined in step S16 that the size of the array N(m) is not 1. The image setting unit 33 executes processing of L=m (step S30). In other words, since m=2 in the previous example, a process of setting L to 2 is executed. Further, the image setting unit 33 sets m to 1 (step S31).

Next, the image setting unit 33 sets the display contents of the notification image in the array N(m) (step S32). In step S32, for example, when the notification image 50 is stored in a predetermined area of the memory such as the RAM 13, display contents different from those of the stored notification image 50 are set. The notification image 50 in the memory is cleared in the first process of step S32, and thus the preset display contents and arbitrary display contents are set, but different display contents are set in step for the second and subsequent time. In other words, as shown in FIG. 3, the image setting unit 33 sets the notification image 51 having the shape, color, or a combination thereof different from that of the notification image 50 in the array N(m).

After the process of step S32, the image setting unit 33 executes increment processing of "m=m+1" (step S33). Then, the image setting unit 33 determines to be m>L in order to determine whether the display contents of the notification image 50 are set for all the acquired dishes (A set meal, curry rice in this example) (step S34).

When m>L is established, different notification images 50 and 51 are set for each dish (Yes in step S34). Therefore, in this case, the process proceeds to a process of setting the projection position in step S35. In step S35, the projection positions of the notification images 50 and 51 according to the number of available servings are set for each of the notification images 50 and 51 which are images representing that m kinds of dishes can be served. Specifically, in the example of FIG. 3, since the number of available servings of the notification images 50 corresponding to the A set meal is 5, the projection positions of the five notification images 50 are set, respectively, and since the number of available servings of the notification images 51 corresponding to the curry rice is 5, the projection positions of the five notification images 51 are set, respectively. Then, the notification images 50 and 51 are projected at the corresponding projection positions (step S36)

When m>L is not established, the display contents of any of the notification images 50 and 51 corresponding to the dishes is not set (No in step S34). Specifically, in the example of FIG. 3, the display contents corresponding to the notification image 50 representing the A set meal is set in the first process of step S32, m is incremented to 2 in subsequent step S33, and the condition of step S34 is not satisfied, whereby the process returns to step 32. Next, the display contents of the notification image 51 representing the curry rice is set in the second process of step S32, m becomes 3 in step S33, and the condition of step S34 is satisfied, whereby the process proceeds to step S35.

Examples of the flowcharts have been described with reference to FIGS. 6 to 8. In the examples, the processing is performed by defining the one-dimensional array, but is not limited thereto. For example, the array N may be defined as a two-dimensional array, N(1)(1) may set the dish name (A set meal, curry), and N(1)(2) may set the number of available servings (5 servings) corresponding to N(1)(1). In the example, the two-dimensional array is an array of 3 rows and 2 columns, for example, N(3)(2)={("A set meal", 5) ("curry rice", 6), ("udon", 7)}, in which a row increases. As described above, the flow charts are merely examples, and contents thereof can be changed as appropriate.

As described above, the projection processing device 10 of the present embodiment includes the processing unit 20 that acquires the number of available servings of a service and executes the projection processing for projecting the notification images 50 that notifies the information on the number of available servings. Thus, since the number of available servings of a service can be visually displayed, it is possible to prevent a situation in which the services are lined up in a row even when being uncapable of being provided. Further, by the display of the number of available servings, it is possible to raise a desire to receive the service and contribute to an increase in sales.

Further, the processing unit 20 of the present embodiment changes the display contents of the notification images 50 and 51 for each kind of service. Thus, the service can be identified by the display contents and lined up in a row, and the convenience of the customer who receives the service can be enhanced.

Hereinafter, projection processing in a mode different from that of the above embodiment will be described. The same or similar components as those in the above embodiment are denoted by the same reference numerals, and may not be described.

Figure 9:
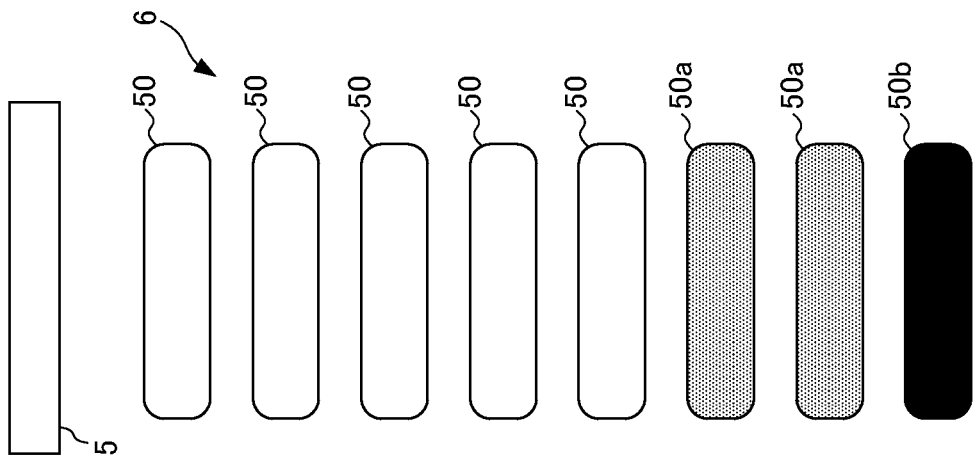
FIG. 9 is a schematic diagram showing an example of a notification image projected on the floor on the service receipt side of the counter at the store by the projection device according to the present embodiment.
Figure 10:
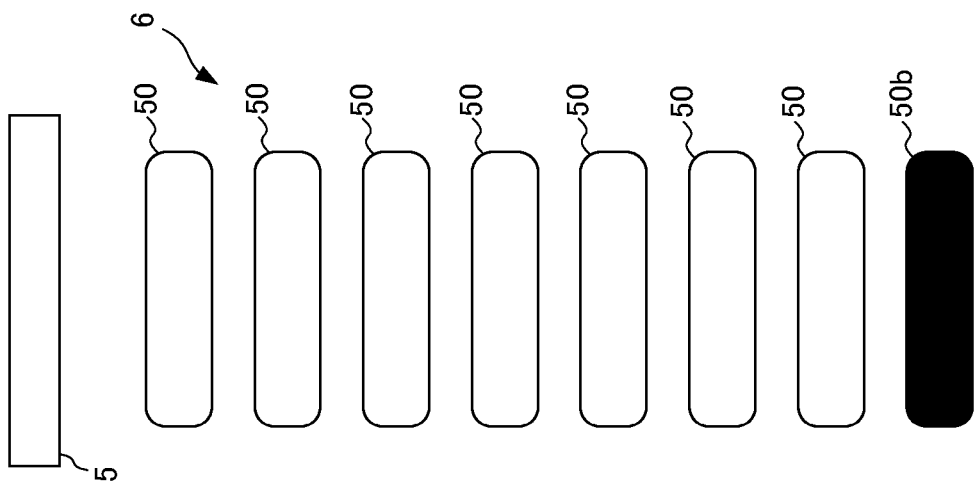
FIG. 10 is a schematic diagram showing an example of a notification image projected on the floor on the service receipt side of the counter at the store by the projection device according to the present embodiment.
Figure 11:
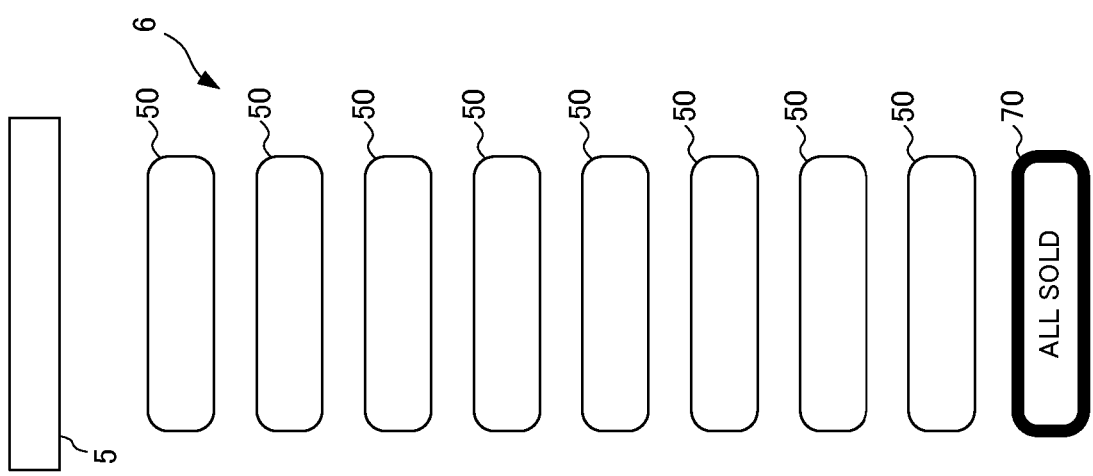
FIG. 11 is a schematic diagram showing an example of a notification image projected on the floor on the service receipt side of the counter at the store by the projection device according to the present embodiment.

Next, a description will be given with reference to FIGS. 9 to 11 with respect to a case in which the display contents of the notification image 50 are changed according to the number of available servings. Each of FIGS. 9 to 11 is a schematic diagram showing an example of the notification image projected on the floor 6 on the service receipt side of the counter 5 at the store by the projection device 2 of the present embodiment. Each of FIGS. 9 to 11 shows an example of a case in which the number of available servings of the A set meal is 8.

In the example shown in FIG. 9, the image setting unit 33 executes processing for stepwise changing the color of the notification image 50 according to the number of available servings. In this example, color-changed notification images 50a and 50b are projected in addition to the notification image 50 by the projection device 2 at stages at which the number of available servings is three left. The image setting unit 33 sets, for example, the first to fifth notification images 50 to green, and sets the sixth and seventh notification images 50a to yellow. Then, the image setting unit 33 sets the final eighth notification image 50b to red. The color change herein indicates that the color inside the frame line forming the notification image 50 is changed.

In the example shown in FIG. 10, the image setting unit 33 changes a color of only a notification image 50b located at the rearmost position among a plurality of notification images 50. Specifically, the image setting unit 33 sets, for example, first to seventh notification images 50 to green, and sets only the eighth notification image 50b to red.

In the example shown in FIG. 11, the image setting unit 33 sets display contents of a notification image 70 including a service provision state (for example, a text or an image) behind notification images 50 indicating the number of available servings. The image setting unit 33 sets, for example, first to eighth notification images 50 indicating the number of available servings to green. Then, separately from the notification image 50, the projection processing unit 36 sets a projection position of a notification image 70 including text information indicating all sold at a position behind the eighth notification image 50 so as to be located with a predetermined interval. The provision state described above means, for example, all sold, SOLD OUT, or out of stock.

As described above, the display contents of the notification image 50 are set based on predetermined rules as shown in FIGS. 9 to 11, respectively. The change of the display contents according to the number of available servings shown in FIGS. 9 and 10 is executed in the process of step S20 in FIG. 7 and the process of step S32 in FIG. 8, for example.

The projection processing of the notification image 70 including the text information indicating all sold shown in FIG. 11 is executed, for example, between steps S20 and S21 in FIG. 7 and between steps S34 and S35 in FIG. 8.

Figure 12:
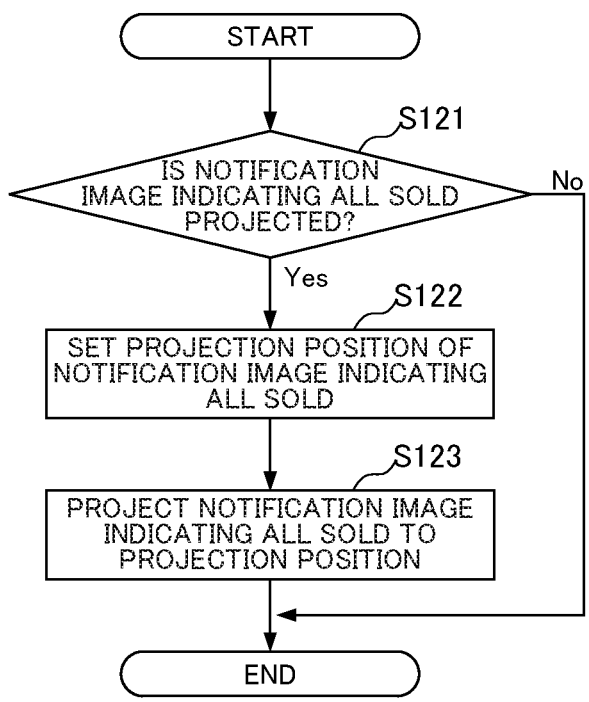
FIG. 12 is a flowchart for describing a flow of processing to be executed by the projection processing device according to the present embodiment to display a notification image indicating all sold.

FIG. 12 is a flowchart for describing a flow of processing to be executed by the projection processing device 10 of the present embodiment to display the notification image 70 indicating all sold. The flowchart shown in FIG. 12 is a subroutine inserted between steps S20 and S21 or between steps S34 and step S35, for example.

As shown in FIG. 12, the image setting unit 33 confirms whether a mode is set in which the notification image 70 indicating all sold is displayed (step S121). When the mode is not set in which the notification image 70 indicating all sold is displayed (No in step S121), the image setting unit 33 ends the subroutine. Here, the mode may be set by the employee who operates the input unit 14 of the projection processing device 10 at the store 4, or may be a display mode set in advance by the projection processing device.

When the mode is set in which the notification image 70 indicating all sold is displayed (Yes in step S121), the process proceeds to step S122 and the projection processing unit 36 performs the process. Next, the projection processing unit 36 sets a projection position of the notification image 70 indicating all sold (step S122). The projection position is set, for example, behind the notification image 50 corresponding to the rearmost position of the number of available servings. After the process of step S122, the projection processing unit 36 projects the notification image 70 indicating all sold to the projection position set in step S122, and ends the subroutine.

As described above, the processing unit 30 in the projection processing device 10 of the present embodiment changes the display contents of the notification images 50, 50a, and 50b according to the number of available servings. Thus, it is possible to notify the customer of the current status of the number of available servings in an easier-to-understand manner.

As described above, the projection system 1 of the present embodiment includes the image capturing device 3. The projection processing device 10 of the present embodiment can also change the display contents of the notification image 50 based on the captured image which is captured by the image capturing device 3. Referring to FIGS. 13 to 18, the projection processing based on the image captured by the image capturing device 3 will be described. FIGS. 13 to 18 are schematic diagrams for stepwise describing the projection processing to be executed based on the captured image by the projection processing device 10 of the present embodiment.

Figure 13:
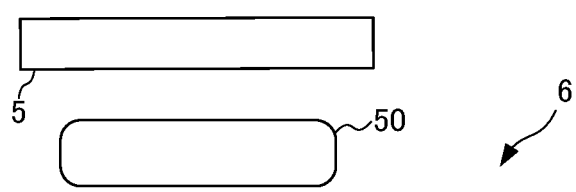
FIG. 13 is a schematic diagram for describing stepwise the projection processing to be executed by the projection processing device according to the present embodiment based on a captured image.

FIG. 13 shows a state in which there is no user 8 in a state where the number of available servings of A set meal is 5. The captured image acquisition unit 34 acquires a captured image showing the state of FIG. 13 from the image capturing device 3. Then, the image determination unit 35 determines the presence or absence of the user 8 (person) based on the captured image. At the stage of FIG. 13, the image determination unit 35 determines that the user 8 is not present by image processing. As described above, since the number of available servings is 5 but the user 8 is not detected, only one notification image 50 indicating that the A set meal can be provided is projected to the projection position.

Figure 14:
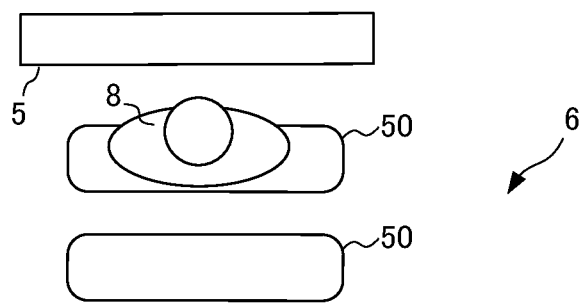
FIG. 14 is a schematic diagram for describing stepwise the projection processing to be executed by the projection processing device according to the present embodiment based on a captured image.

FIG. 14 shows a state in which the user 8 is standing on the floor 6 on the service receipt side of the counter 5 at the store 4 with the first notification image 50 as a mark. The captured image acquisition unit 34 acquires a captured image showing the state of FIG. 14 from the image capturing device 3. The image determination unit 35 determines the presence or absence of the user 8 based on a positional relationship between the notification image 50 and the user 8. For example, when it is analyzed that the notification image 50 and the user 8 overlap each other by the image processing, the image determination unit 35 determines that the user 8 is present. The projection device 2 can project the notification image 5 on the floor 6 instead of the user 8 by irradiating the image from an oblique direction rather than directly above. In FIG. 14, since it is detected that the user 8 is present at the position of the first notification image 50, a notification image 50 is added behind the first notification image 50 and is projected.

Figure 15:
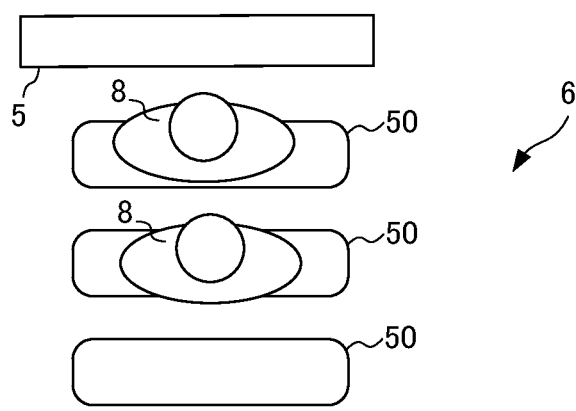
FIG. 15 is a schematic diagram for describing stepwise the projection processing to be executed by the projection processing device according to the present embodiment based on a captured image.

FIG. 15 shows a state in which two persons are standing on the floor 6 on the service receipt side of the counter 5 at the store 4 with notification images 50 as marks. After the second user 8 is detected by the same processing as in FIG. 14, a third notification image 50 is projected behind the second notification image 50.

Figure 16:
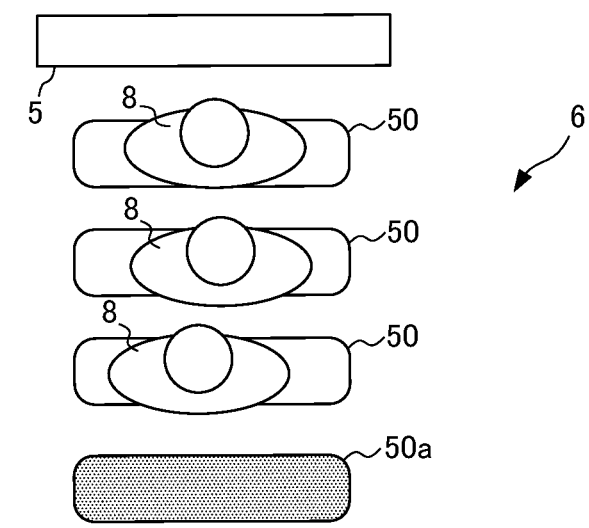
FIG. 16 is a schematic diagram for describing stepwise the projection processing to be executed by the projection processing device according to the present embodiment based on a captured image.

FIG. 16 shows a state in which three persons are standing on the floor 6 on the service receipt side of the counter 5 at the store 4 with notification images 50 as marks. As described above, since the number of available servings is 5 but the three persons are lined up, the remaining number of available servings is 2. The image setting unit 33 projects the color-changed notification image 50a described with reference to FIG. 9 as a fourth notification image 50 behind the third notification image 50.

Figure 17:
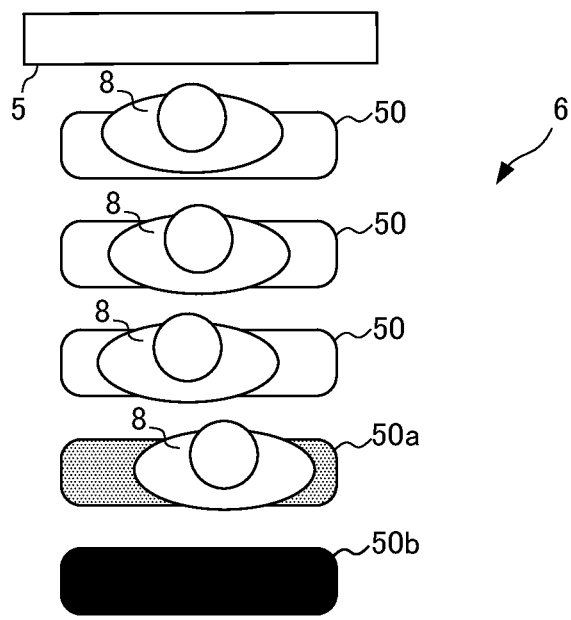
FIG. 17 is a schematic diagram for describing stepwise the projection processing to be executed by the projection processing device according to the present embodiment based on a captured image.

FIG. 17 shows a state in which four persons are standing on the floor 6 on the service receipt side of the counter 5 at the store 4 with notification images 50 and 50a as marks. Since the number of available servings is 5 but the four persons are lined up, the remaining number of available servings is 1. Therefore, the image setting unit 33 projects a color-changed notification image 50b as a fifth notification image 50 behind the fourth notification image 50a.

Figure 18:
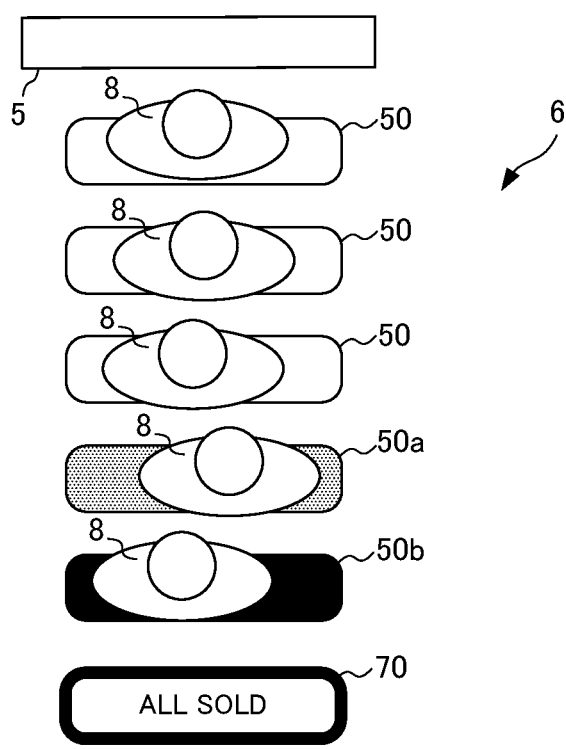
FIG. 18 is a schematic diagram for describing stepwise the projection processing to be executed by the projection processing device according to the present embodiment based on a captured image.

FIG. 18 shows a state in which five persons are standing on the floor 6 on the service receipt side of the counter 5 at the store 4 with notification images 50, 50a, and 50b as marks. Since the number of available servings is 5 but the five users 8 are lined up, there is in a state of all sold. The projection processing unit 36 projects the notification image 70 indicating all sold described in FIG. 11 behind the notification image 50b.

Figure 19:
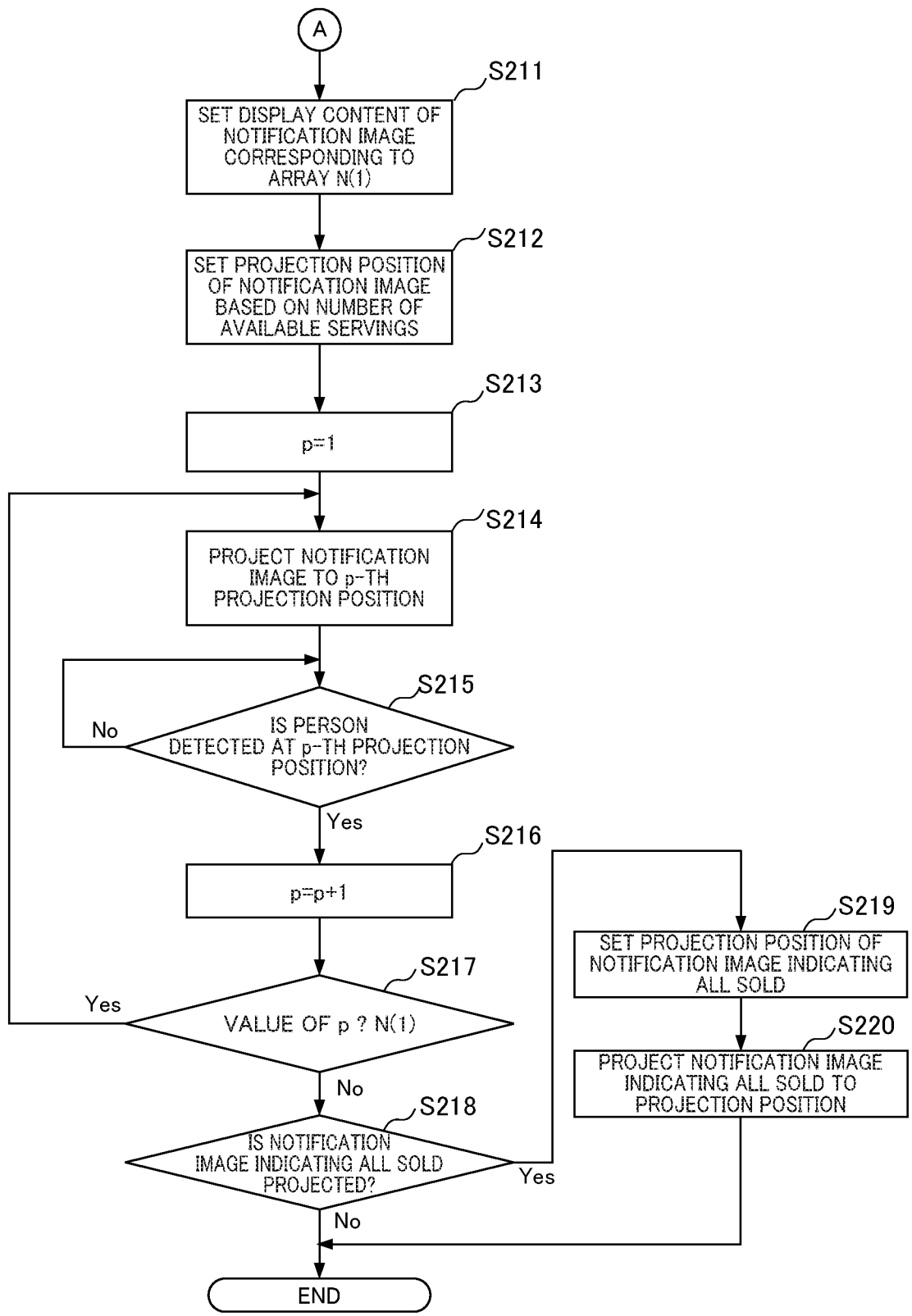
FIG. 19 is a flowchart for describing the flow of the projection processing to be executed by the projection processing device according to the present embodiment based on the captured image.

A flow of the projection processing based on the captured image will be described with reference to FIG. 19. FIG. 19 is a flowchart for describing the flow of the projection processing to be executed based on the captured image by the projection processing device 10 of the present embodiment. The flowchart in FIG. 19 is a modification of the processing of the flowchart in FIG. 7, and shows processing when it is determined in step S16 of FIG. 6 that the size of the array N(m) is 1.

As shown in FIG. 19, the image setting unit 33 sets display contents of the notification images 50, 50a, and 50b corresponding to the array N(1) (step S211). In step S211, the display contents of the notification images 50, 50a, and 50b are set based on the predetermined rules shown FIGS. 9 to 11.

After the process of step S211, the projection processing unit 36 sets a projection position at which the notification image 50 is projected based on the number of available servings (step S212). Next, the projection processing unit 36 defines a variable p, and executes processing for substituting 1 into the variable p (step S213). The variable p may be defined at another timing as in step S6 of FIG. 6.

After step S213, the projection processing unit 36 executes processing for projecting the notification image 50 at a p-th projection position among the projection positions set in step S211 (step S214). Specifically, the notification image 50 is projected at a first projection position in the first process of step S214.

Next, the image determination unit 35 determines, based on the captured image acquired from the image capturing device 3 by the captured image acquisition unit 34, whether the user 8 is present at the p-th projection position (step S215). In such determination, it is determined whether the user 8 is present on the notification images 50, 50a, and 50b projected at the rearmost position among the notification images 50 to be projected. When the user 8 is present at the p-th projection position (Yes in step S215), the process proceeds to step S216, and when the user 8 is not present at the p-th projection position (No in step S215), the determination processing is continued. Specifically, it is determined in the first process of step S215 whether the user 8 is present on the notification image 50 at the first projection position.

When it is determined in step S215 that the user 8 is present, the image determination unit 35 executes increment processing of "p=p+1" (step S216). Then, the image determination unit 35 determines whether a "value of p<N(1)" is established (step S217). When the "value of p<N(1)" is established (Yes in step S217), since there is still room in the number of available servings, the process proceeds to step S214 and the image determination unit 35 repeats the following processes. When the "value of p<N(1)" is not established, the process proceeds to step S218. Specifically, in the first process of step S217, since p=2 and N(1) is 5, which is the number of available servings of A set meal, it is determined to be No in step S217 and the process returns to step S213.

In step S218, it is determined whether the projection processing unit 36 displays the notification image 70 indicating all sold (step S218). The projection processing unit 36 confirms whether the dish is in a state of all sold that cannot be provided, for example. The state of all sold is input to the projection processing device 10 by the service provider 7, for example. In the case of not being in the state of all sold, the image setting unit 33 end the process (No in step S218).

In the case of being in the state of all sold, the projection processing unit 36 proceeds the process to step S219 (Yes in step S218). In step S219, the projection processing unit 36 sets the projection position of the notification image 70 indicating all sold (step S219). The projection position is set behind the notification image 50 detected by the user 8, for example. Next, the projection processing unit 36 projects the notification image 70 indicating all sold to the projection position set in step S219, and ends the process.

The description has been given above with reference to FIG. 19 with respect to the processing when the size of the array N(m) is determined to be 1 in step S16 of FIG. 6 in this example. When the size of the array N(m) is determined not to be 1 in step S16 of FIG. 6, processing is executed in which the processing of the flowchart of FIG. 8 and the processing described with reference to FIG. 19 are combined.

As described above, the processing unit 30 in the projection processing device 10 of the present embodiment acquires the captured image including the notification images 50, 50a, and 50b and the user 8 projected to the predetermined positions, and changes the display contents of the notification images 50, 50a, and 50b based on the positional relationship between each of the notification images 50, 50a, and 50b and the user 8 in the captured image.

Next, a case will be described with reference to FIGS. 20 to 25 where the projection processing is performed based on the change in positional relationship between the notification image 50 and the user 8. Each of FIGS. 20 to 25 is a schematic diagram for describing stepwise the projection processing to be executed by the projection processing device 10 of the present embodiment based on the change in positional relationship between the notification image 50 and the user 8. The number of available servings is 5 in this example.

Figure 20:
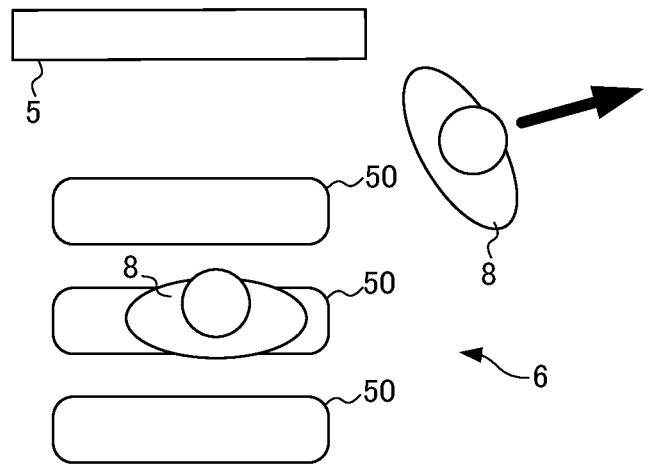
FIG. 20 is a schematic diagram for describing stepwise the projection processing to be executed by the projection processing device according to the present embodiment based on a change in positional relationship between a notification image and a person.
Figure 21:
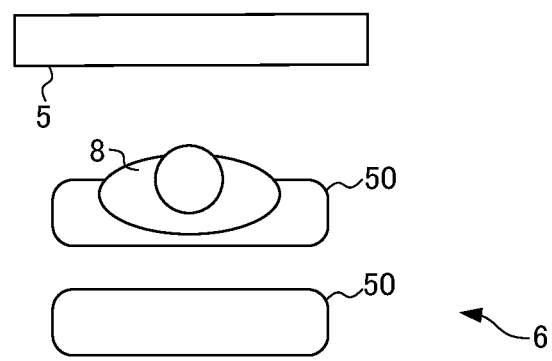
FIG. 21 is a schematic diagram for describing stepwise the projection processing to be executed by the projection processing device according to the present embodiment based on a change in positional relationship between a notification image and a person.

The example of FIG. 20 shows a state in which the user 8 who is in a first line is away from the line by getting the A set meal or being guided to a seat. When it is detected as a change in positional relationship that the user 8 is away from the notification image 50 projected on the store 4, the image determination unit 35 stops the projection of the notification image 50 most projected on the store 4. Thus, as shown in the example of FIG. 21, since one person is reduced from a state in which two persons are lined up, a state becomes in which one person is lined up on the notification image 50. Specifically, the change in positional relationship is to detect a state in which there is no user on the notification image 50 as the user moves, from the state in which the user is present on the notification image 50.

Figure 22:
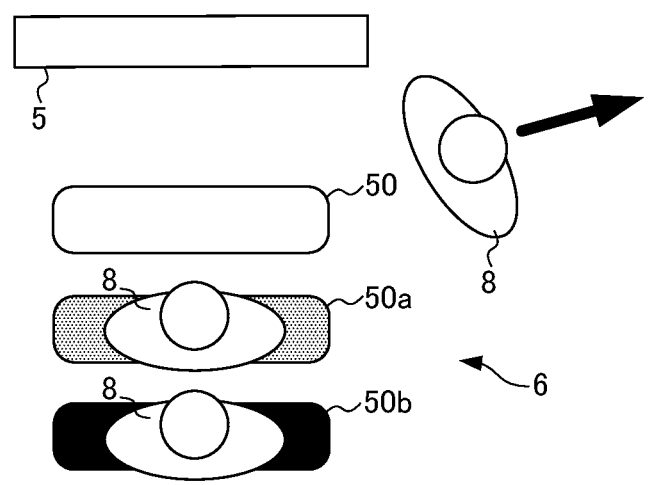
FIG. 22 is a schematic diagram for describing stepwise the projection processing to be executed by the projection processing device according to the present embodiment based on a change in positional relationship between a notification image and a person.

In the example of FIG. 22, the image setting unit 33 performs processing for changing a color of the notification image 50 according to the remaining services from the number of available servings after the service is provided to the user 8. For example, the image setting unit 33 sets a first notification image 50 (third service) located closest to the store 4 to green, sets a notification image 50a (fourth service) located at a second position to yellow, and sets a notification image 50b (fifth service) located at a third position to red. FIG. 22 shows a state in which the user 8, who is in a first line among three persons lined up in a line, is away from the line while the projection processing is being performed.

When it is detected as a change in positional relationship that the user 8 is away from the notification image 50 projected on the store 4, the image determination unit 35 changes the display contents of the notification images 50, 50a, and 50b and stops the projection of the frontmost notification image 50. For example, the projection processing unit 36 stops the projection of the first notification image 50 located closest to the store 4. Then, the projection processing unit 36 moves the projection position of notification image 50a located at the second position to the first projection position, and moves the projection position of the third notification image 50b to the second projection position.

Figure 23:
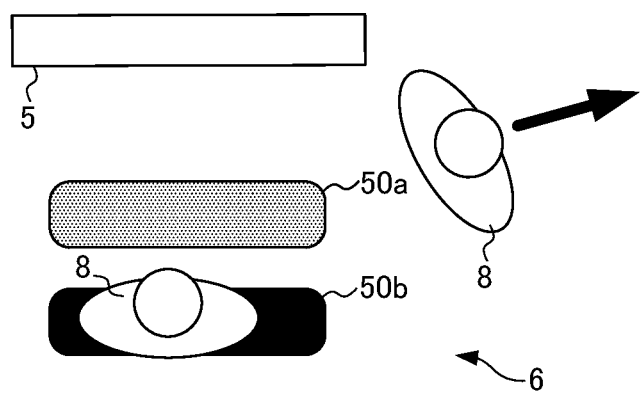
FIG. 23 is a schematic diagram for describing stepwise the projection processing to be executed by the projection processing device according to the present embodiment based on a change in positional relationship between a notification image and a person.

The example of FIG. 23 shows a state in which the user 8, who is in a first line among two persons lined up in a line, is away from the line. When it is detected as a change in positional relationship that the user 8 is away from the notification image 50a closest to the store 4, the image determination unit 35 further changes the display contents of the notification images 50a and 50b. For example, the projection processing unit 36 stops the projection of the first notification image 50a located closest to the store 4, and moves the projection position of the second notification image 50b to the first projection position.

Figure 24:
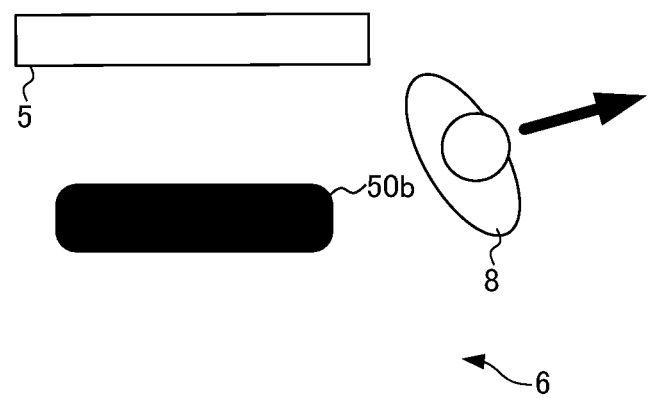
FIG. 24 is a schematic diagram for describing stepwise the projection processing to be executed by the projection processing device according to the present embodiment based on a change in positional relationship between a notification image and a person.
Figure 25:
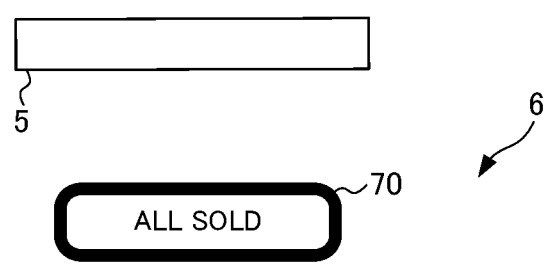
FIG. 25 is a schematic diagram for describing stepwise the projection processing to be executed by the projection processing device according to the present embodiment based on a change in positional relationship between a notification image and a person.

The example of FIG. 24 shows a state in which the last person is away from the notification image 50b. When it is detected as a change in positional relationship that the user 8 is away from the notification image 50b closest to the store 4, the image determination unit 35 changes the notification image 50b to a notification image 70. The example of FIG. 25 shows a state in which a notification image 70 indicating all sold is projected on the floor 6 on the receipt side of the counter 5 at the store 4. Thus, the fact is clearly shown on the receipt side of the counter 5 that the A set meal is sold out.

Next, the flow of the projection processing described with reference to FIGS. 20 to 25 will be described with reference to flowcharts of FIGS. 26 and 27.

Figure 26:
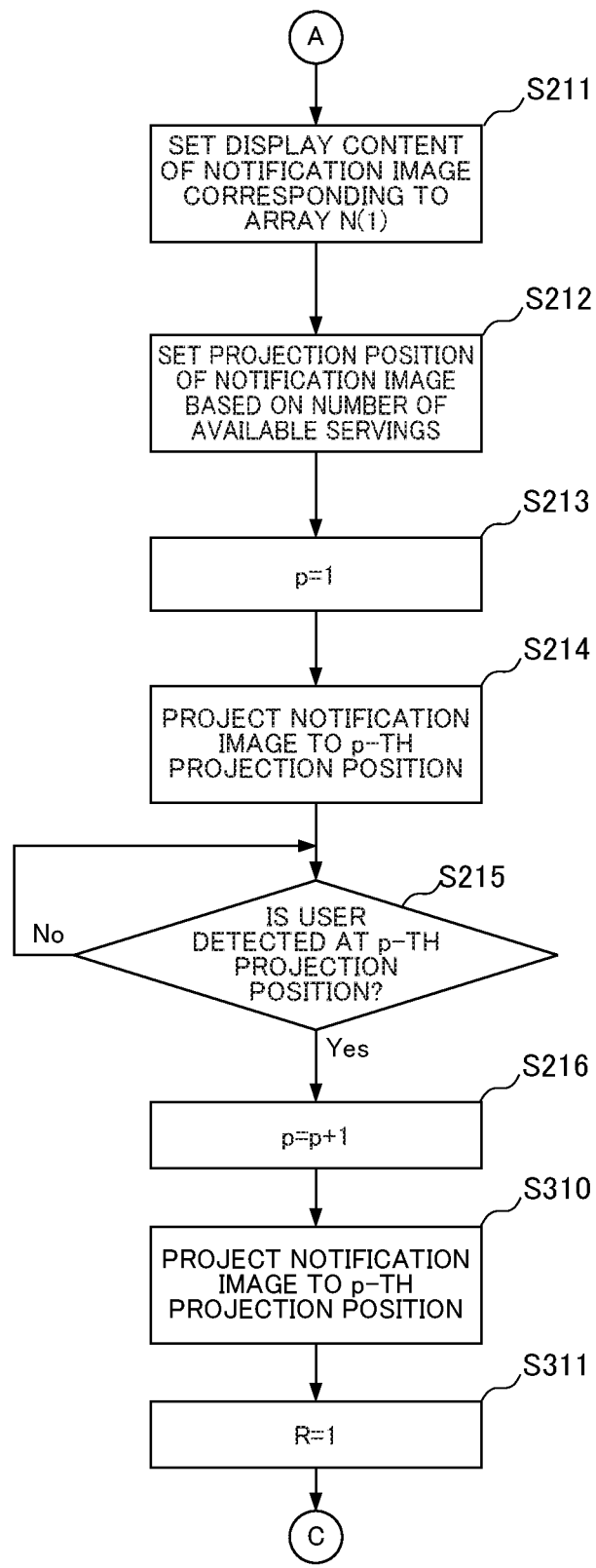
FIG. 26 is a flowchart for describing a former half of the flow of the projection processing to be executed by the projection processing device according to the present embodiment based on the captured image.
Figure 27:
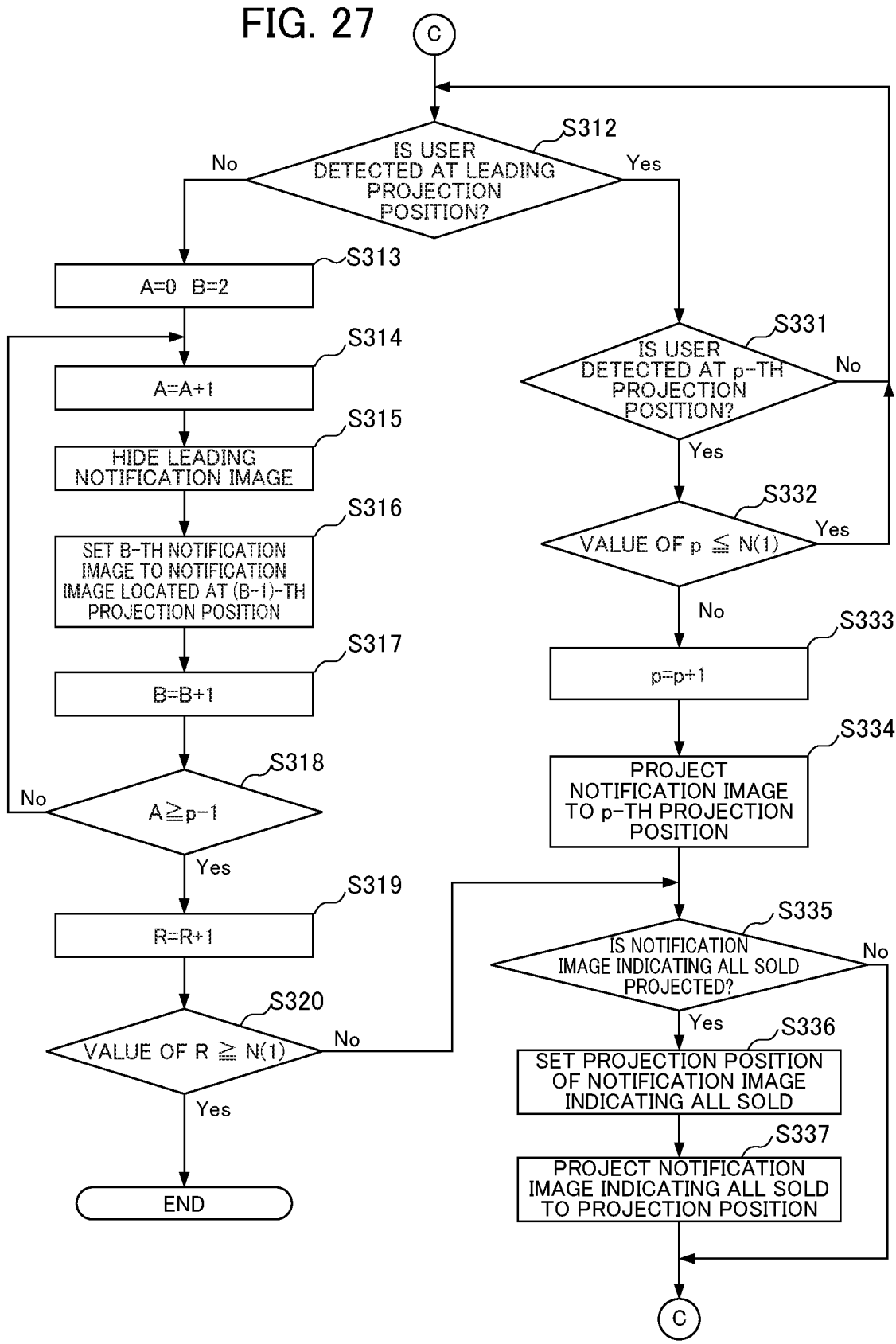
FIG. 27 is a flowchart for describing a latter half of the flow of the projection processing to be executed by the projection processing device according to the present embodiment based on the captured image.

The flowchart shown in FIG. 26 is the same as the flowchart of FIG. 19 except that the processes after step S216 are different. For this reason, the processes up to step S216 are not described, and processes from step S310 after step S216 will be described.

In step S310, the projection processing unit 36 executes processing for projecting a notification image to a p-th projection position. Specifically, the notification image is projected to the first projection position. Further, the image setting unit 33 defines a variable R, and substitutes 1 into the variable R (step S311). After step S311, the image determination unit 35 determines by image processing whether the user 8 is present on the notification image located at the leading projection position (step S312). The image determination unit 35 analyzes by image processing, for example, whether the entire notification image 50 can be confirmed by the presence of the user 8 at the leading projection position.

When the user 8 is not present on the notification image located at the leading projection position (No in step S312), the projection processing unit 36 defines variables A and B, and substitutes 0 and 2 into the variables A and B, respectively (step S313). Next, the projection processing unit 36 executes increment processing of "A=A+1" (step S314), and executes processing for hiding the notification image 50 located at the leading projection position (step S315).

Next, the projection processing unit 36 moves a notification image 50 located at a B-th projection position to a (B−1)-th projection position (step S316). Specifically, in a first process of step S316, the projection processing unit 36 moves a notification image 50 located at a second projection position to a first projection position. Next, the projection processing unit 36 executes increment processing of "B=B+1" (step S317). Then, the projection processing unit 36 determines whether a condition of "A≥p−1" is satisfied (step S318). Specifically, since A=1 and p is 2 in a first process of step S318, the above condition is satisfied and the process proceeds to step S319.

When the condition of "A≥p−1" is not satisfied (No in step S318), the process returns to step S314 to increment the variable A. When the condition of "A≥p−1" is satisfied (Yes in step S318), the projection processing unit 36 defines a variable R, substitutes 0 into the variable R, and executes increment processing of "R=R+1" (step S319). Then, the image setting unit 33 determines whether a condition of "value of R≥N(1)" is satisfied (step S320). Specifically, since R=1 and a value of N(1)=5 (the number of available servings) in a first process of step S320, it is determined to be No herein. When the condition of "value of R≥N(1)" is satisfied (Yes in step S320), a series processes is completed. When the condition of "value of R≥N(1)" is not satisfied (No in step S320), the process proceeds to step S335.

When the user 8 is present at the leading projection position (Yes in step S312), the projection processing unit 36 determines whether the user 8 is present on the notification image 50 located at the p-th projection position (step S331). Specifically, the projection processing unit 36 determines in a first process of step S331 whether the user 8 is present on the notification image 50 located at the second projection position. When the user 8 is not present at the p-th projection position (No in step S331), the projection processing unit 36 returns the process to step S312. When the user 8 is present at the p-th projection position (Yes in step S331), the image determination unit 35 determines whether a condition of "value of p≤N(1)" is satisfied (step S332). Specifically, for example, since p=2 and a value of N(1)=5 (the number of available servings) in a first process of step S332, the above determination is No.

When the condition of "value of p≤N(1)" is satisfied (Yes in step S332), the image determination unit 35 returns the process to step S312. When the condition of "value of p≤N(1)" is not satisfied (No in step S332), the image determination unit 35 executes increment processing of "p=p+1" (step S333), and the projection processing unit 36 executes processing for projecting the notification image 50 to the p-th projection position, which is the incremented value (step S334). After the process of step S334, the process proceeds to a process of step S335.

In step S335, the image setting unit 33 confirms whether a mode is set in which the notification image 70 indicating all sold is displayed (step S335). When there is not a state of all sold (No in step S335), the process returns to step S312 to execute the processing for detecting the user 8.

When there is a state of all sold (Yes in step S335), the projection processing unit 36 proceeds the process to step S336. In step S336, the projection processing unit 36 sets the projection position of the notification image 70 indicating all sold (step S336). The projection position is set to, for example, a first projection position when the user 8 is not detected by prior processing, and is set behind the notification image 50, on which the last user is detected, when the user 8 is detected. Next, the projection processing unit 36 projects the notification image 70 indicating all sold to the projection position set in step S336 (step S337). After the process of step S337, the process returns to step S312 to execute the processing for detecting the user 8.

The process flow has been described above with reference to the flowcharts of FIGS. 26 and 27. When the size of the array N(m) is determined not to be 1 in step S16 of FIG. 6, processing is executed in which the processing of the flowchart of FIG. 8 and the processing described with reference to FIG. 26 are combined.

As described above, the processing unit 30 in the projection processing device 10 of the present embodiment changes the display contents of the notification images 50, 50a, and 50b according to the change in positional relationship between each of the notification images 50, 50a, and 50b and the user 8. Thus, the display contents of the notification images 50, 50a, and 50b can be automatically updated according to the movement of the user 8, and it is possible to present the customer with information on the number of available servings that is more suitable for the current status.

Figure 28:
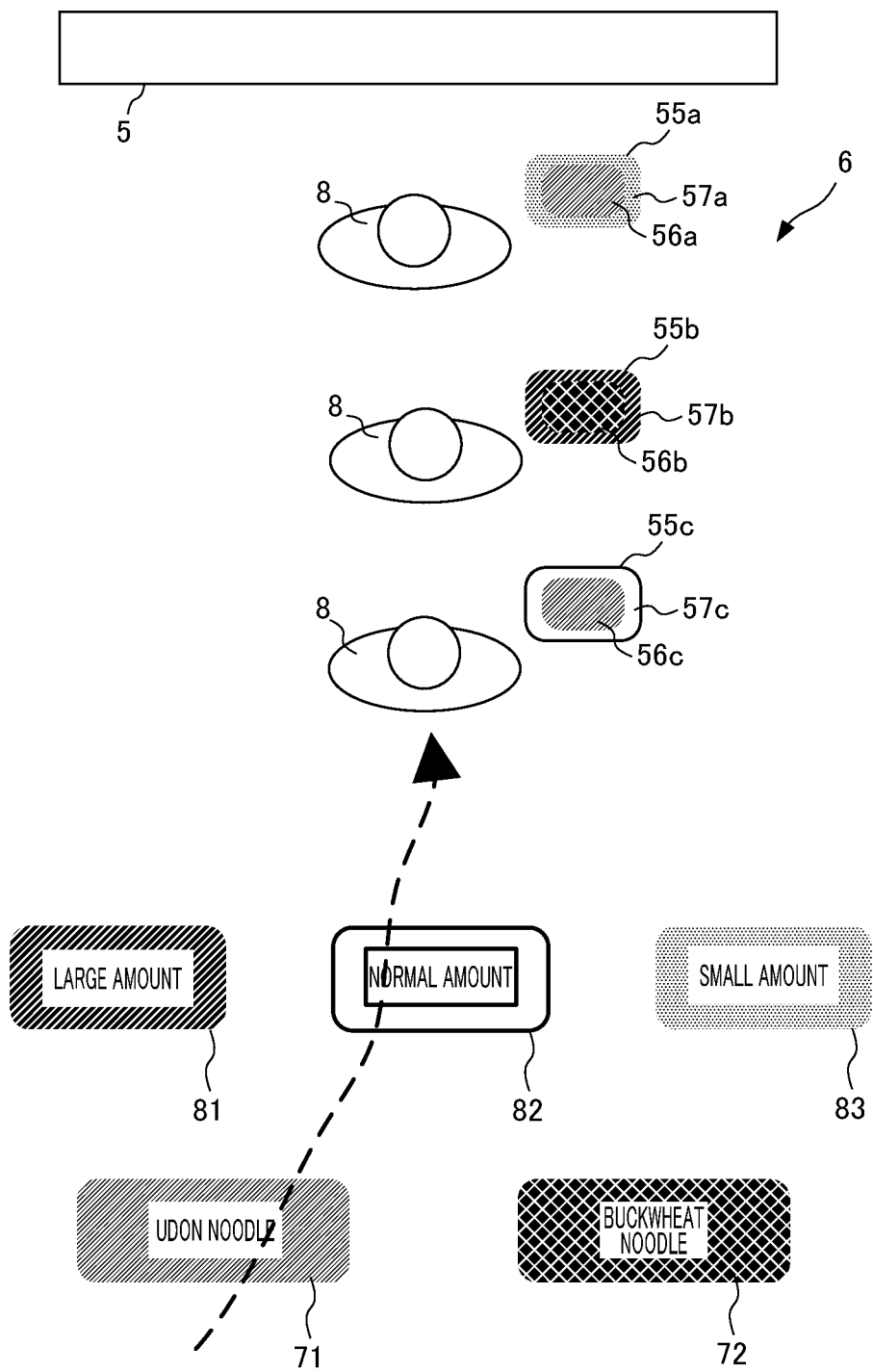
FIG. 28 is a schematic diagram for describing processing to be executed by the projection processing device according to the present embodiment to determine a dish based on a captured image.

Next, processing for determining a dish based on the captured image will be described with reference to FIG. 28. FIG. 28 is a schematic diagram for describing processing to be executed by the projection processing device 10 according to the present embodiment to determine a dish based on the captured image.

In the example shown in FIG. 28, all of notification images 55a to 55c are projected at non-overlapping positions with the user 8. For example, the projection processing unit 36 sets projection positions based on the position where the user 8 is lined up in a line. Alternatively, the image determination unit 35 may detect the user 8, and the projection processing unit 36 may set the projection position at a position away from the detected user 8.

Further, display contents of the notification images 55a to 55c indicate the order of the user 8. In this example, central areas 56a to 56c indicate dishes, and outer peripheral areas 57a to 57c surrounding the central areas 56a to 56c indicate the amount of the dish. For example, in the notification image 55a, a pattern having a color and a shape indicating udon noodles is displayed in the central area 56a, and a pattern having a color and a shape indicating a small amount is displayed in the outer peripheral area 57a. In the notification image 55b, a pattern showing buckwheat noodles is displayed in the central area 56b, and a pattern showing a large amount is displayed in the outer peripheral area 57b. In the notification image 55c, a pattern showing udon noodles is displayed in the central area 56c, and a pattern showing a normal amount is displayed in the outer peripheral area 57c.

Further, in the example of FIG. 28, selection images 71, 72, and 81 to 83 for deciding the dish are projected by the projection device 2. Projection positions of the selection images 71, 72, and 81 to 83 are set behind the line in which the user 8 is lined up, for example.

The selection images 71, 72, and 81 to 83 will be described. The selection images 71 and 72 are used to decide a kind of dish. Each of the selection images 71 and 72 is configured by, for example, a rectangular image and a text arranged inside the image. The selection image 71 shows udon noodles, and the selection image 72 shows buckwheat noodles. The selection images 81 to 83 are used to decide the amount of the dish. The selection image 81 is configured by, for example, a rectangular image and a text indicating the amount arranged inside the image. The selection image 81 shows a large amount, the selection image 82 shows a normal amount, and the selection image 83 shows a small amount.

Figure 29:
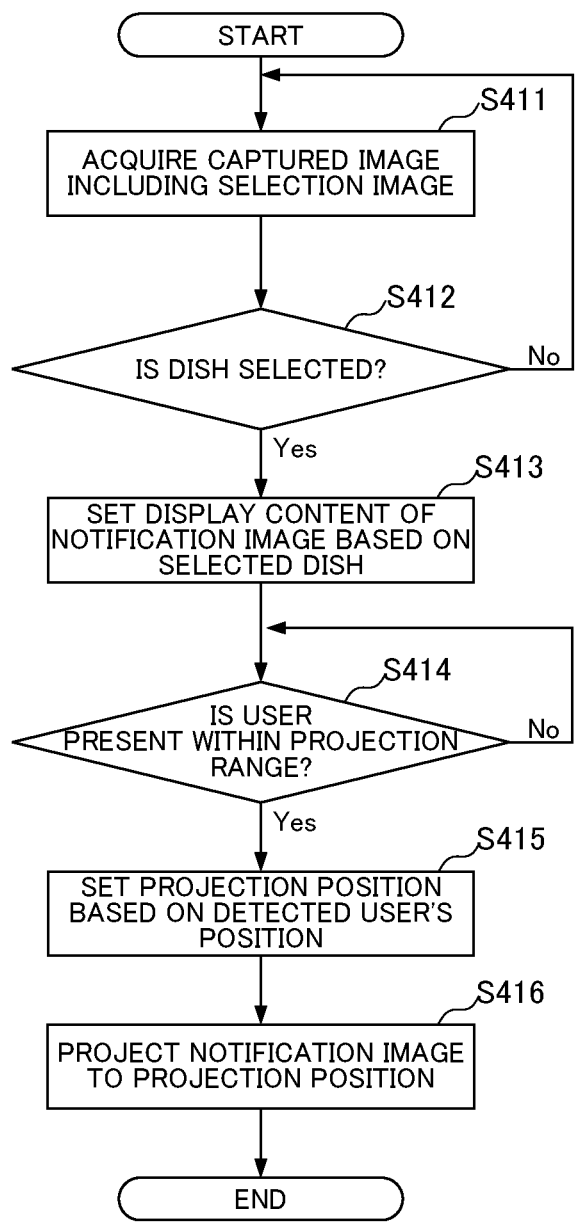
FIG. 29 is a flowchart for describing a flow of the projection processing to be executed by the projection processing device according to the present embodiment based on the captured image.

Next, a flow of processing will be described with reference to FIG. 29. FIG. 29 is a flowchart for describing a flow of the projection processing to be executed by the projection processing device 10 according to the present embodiment based on the captured image.

The captured image acquisition unit 34 acquires captured images including all of the selection images 71, 72, and 81 to 83 (step S411).

Next, the image determination unit 35 determines a dish selected by the user 8 based on a positional relationship between each of the selection images 71, 72, and 81 to 83 in the captured images and the user 8 (step S412). A broken line arrow in FIG. 28 indicates a moving path of the user 8 who is lined up at the rearmost line. According to the moving path, the user 8 is lined up at the rearmost line by passing through the selection image 82 showing a normal amount after passing through the selection image 71 showing udon noodles. The image determination unit 35 determines that a normal amount of udon noodles has been ordered in this state.

When image determination unit 35 determines that the dish has not been selected (No in step S412), the process returns to the process of step S411 for newly acquiring the captured images including all of the selection images 71, 72, and 81 to 83. When the image determination unit 35 determines that the dish has been selected (Yes in step S412), the process proceeds to a process of step S413. In step S413, the image setting unit 33 sets the display contents of the notification images 55a to 55c based on the dish (order contents) selected by the user 8, and then the process proceeds to step S414 (step S413). In the present embodiment, the notification images 55a to 55c and the selection images 71, 72, and 81 to 83 are set such that kinds of the dish and patterns of the amount correspond to each other.

In step S414, it is determined whether the user 8 is in a projection range (step S414). The user 8 determined in step S414 is the user 8 who passes through the selection images 71 and 72 and selects the dish. The determination as to whether to be the user 8 who selects the dish may be made by tracking the user 8 passing through the selection images 71 and 72, or by collating feature points of the image of the user 8 at the time of passing through the selection images 71 and 72. The projection range is, for example, a to-be-projected area set in front of the counter 5. The projection range is set according to the number of available servings. The projection processing unit 36 analyzes the captured images, and detects the presence or absence of the user 8 in each projection range.

When the user 8 is not detected in the projection range (No in step S414), the projection processing unit 36 continues the processing for determining the projection range. When the user 8 is in the projection range (Yes in step S414), the projection processing unit 36 proceeds the process to step S415. When the process proceeds to step S415, the projection processing unit 36 sets the projection position based on the detected position of the user 8 (step S415). The projection processing unit 36 sets, for example, a position away from the user 8 as the projection position, based on a predetermined program. Next, the projection processing unit 36 projects the notification images 55a to 55c to the projection position (step S416). For example, in the case of the previous example, the projection processing unit 36 projects the notification image 55c, which indicates the udon noodles and the normal amount, near the user 8 lined up at the rearmost line. When a plurality of users 8 are detected, the projection position is set for each user 8, and the notification images 55a to 55c corresponding to the users 8 at the projection positions are selected.

As described above, the processing unit 30 in the projection processing device 10 of the present embodiment projects the notification images 55a to 55c to non-overlapping positions with the user 8. Thus, since the notification images 55a to 55c does not overlap with the user 8, it is possible to prevent deterioration of visibility caused by overlapping with the user 8.

Further, when the user 8 passing through the selection images 71, 72, and 81 to 83 set for each kind of service is detected, the processing unit 30 in the projection processing device 10 of the present embodiment determines that there is an order for the service corresponding to the selection images 71, 72, and 81 to 83. Thus, it is possible to automatically accept orders and perform projection processing according to the orders, and the work of accepting the orders can be made more efficient.

Further, the processing unit 30 in the projection processing device 10 of the present embodiment sets the display contents of the notification images 55a to 55c corresponding to the service determined to be ordered. Thus, the service provider can also recognize the order by confirming the notification images 55a to 55c, and the work of accepting the orders can be further made more efficient.

Figure 30:
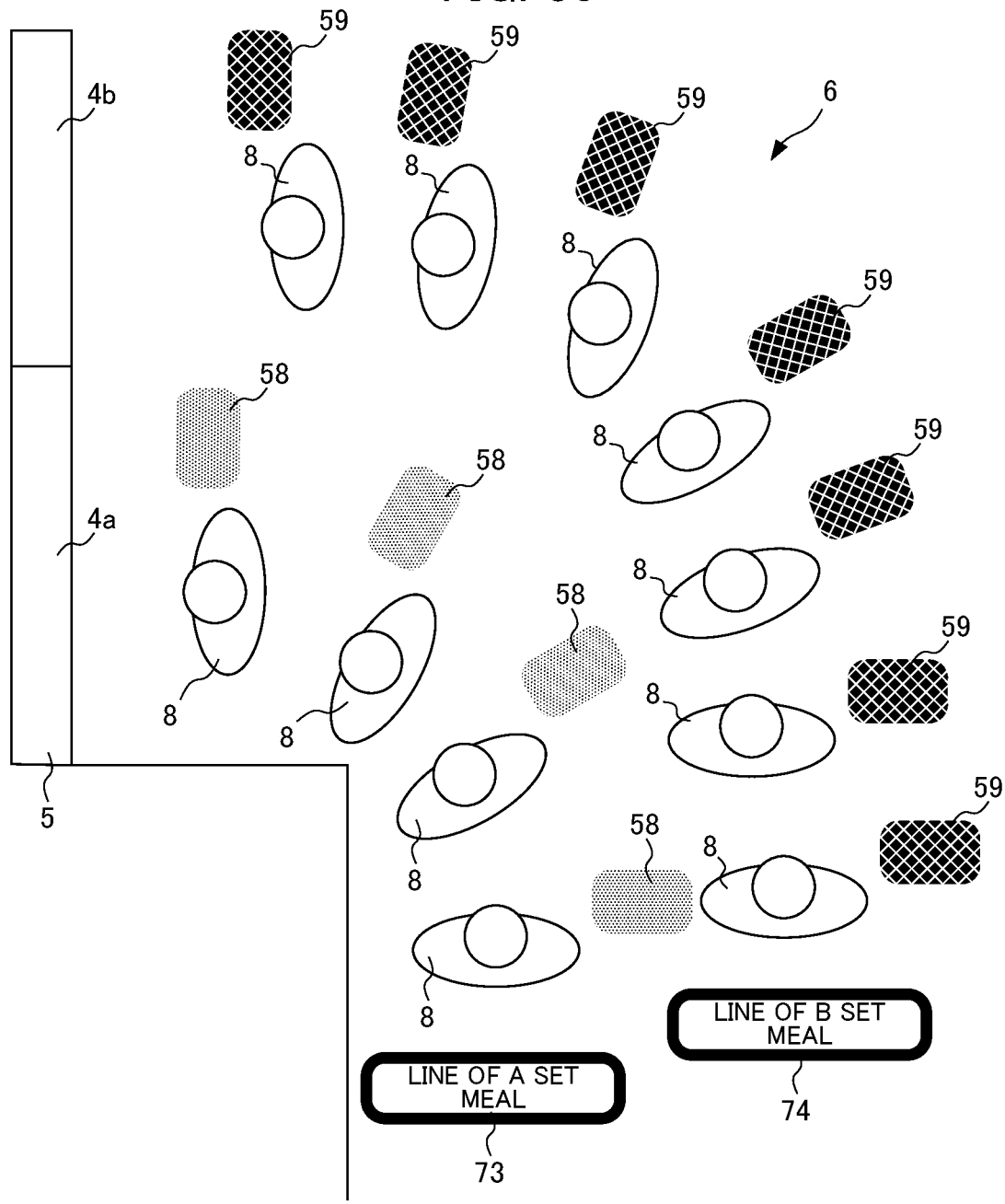
FIG. 30 is a schematic diagram for describing processing to be executed by the projection processing device according to the present embodiment to display a dish at a rearmost position.

Next, a description will be given with respect to processing for projecting an additional information image showing additional information indicating an aligned line. FIG. 30 is a schematic diagram for describing processing to be executed by the projection processing device 10 of the present embodiment to display a dish at the rearmost position of the line.

In the example shown in FIG. 30, a store 4a provides an A set meal as a service, and a store 4b adjacent to the store 4a provides a B set meal as a service. A notification image 58, which is projected at a non-overlapping position with the user 8, is set for the A set meal of the store 4a, and a notification image 59, which is projected at a non-overlapping position with the user 8, is set for the B set meal of the store 4b.

Both of the store 4a and the store 4b are formed with a line in which the user 8 is lined up, but the store 4a and the store 4b are located in a blind spot from the rearmost position of the line. For this reason, it is difficult to determine whether the user 8 lined up at the rearmost position is on a line in which the user is lined up is a line for receiving the service at the store 4a that provides the A set meal, or is on a line for receiving the service at the store 4b that provides the B set meal. Therefore, a dish image 73 indicating a kind of dish is displayed behind the last notification image 58 lined up in the store 4a, and a dish image 74 indicating a kind of dish is displayed behind the last notification image 59 lined up in the store 4b.

Each of the dish images 73 and 74 is configured by, for example, a rectangular image and a text indicating the amount arranged inside the image. In this example, the dish image 73 indicates that a line is the A set meal, and the dish image 74 indicates that a line is the B set meal.

As described above, the processing unit 30 in the projection processing device 10 of the present embodiment projects the dish images 73 and 74 as additional information images showing information different from the number of available servings. Thus, even when the stores 4a and 4b are located in the blind spot when viewed from the rearmost position, it is possible to quickly identify the lines corresponding to the stores 4a and 4b by referring to the dish images 73 and 74.

Figure 31:
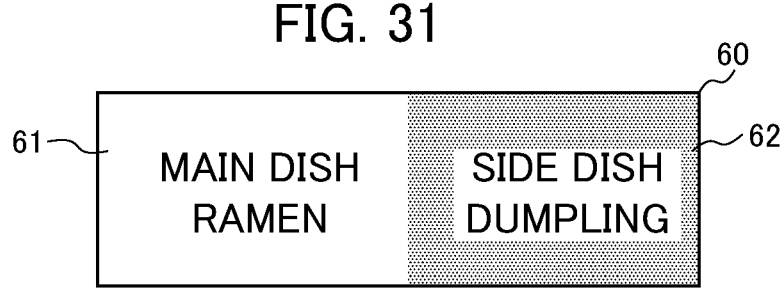
FIG. 31 is a schematic diagram showing an example of a notification image projected on the floor on the service receipt side of the counter at the store by the projection device according to the present embodiment.

Next, an example of a notification image 60, which is different from the configuration of the above embodiment and the modification example, will be described with reference to FIG. 31. The notification image 60 shown in FIG. 31 includes a main dish area 61 showing a main dish and a side dish area 62 showing a side dish. A text and a pattern of color and shape are applied to the main dish area 61 and the side dish area 62. In the example of FIG. 31, ramen is displayed in the main dish area 61, and dumplings are displayed in the side dish area 62. Since the text is displayed in addition to the color, pattern, and shape, the dish can be notified to the user 8 and the service provider in an easy-to-understand manner.

As described above, the notification image can take various formats to notify information regarding the number of available servings. For example, numbers and characters indicating the number of available servings may be displayed as the notification image.

In the above embodiment, the projection processing device 10 has a configuration independent of the projection device 2, but the projection processing device 10 may be configured to be arranged inside the projection device 2 as an electronic device. Next, another embodiment will be described with reference to FIG. 32 in which a projection device 10a has a single configuration.

Figure 32:
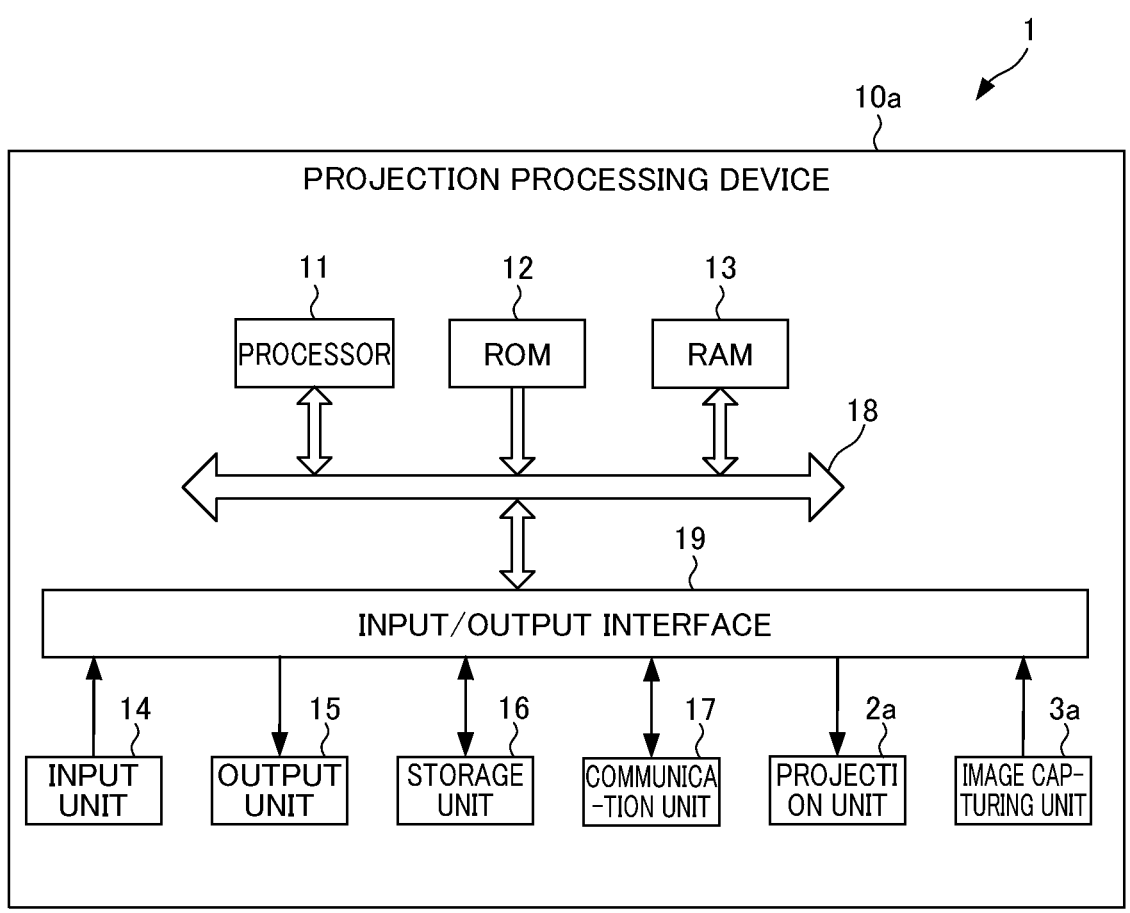
FIG. 32 is a block diagram showing a hardware configuration of a projection device according to another embodiment.

FIG. 32 is a block diagram showing a hardware configuration of the projection device 10a of another embodiment. The projection device 10a shown in FIG. 32 has a configuration in which the projection device 2, the image capturing device 3, and the projection processing device 10 of the above embodiment are integrated. The projection device 10a of another embodiment shown in FIG. 32 includes a processor 11, a ROM 12, a RAM 13, and input unit 14, an output unit 15, a storage unit 16, a communication unit 17, a bus 18, an input/output interface 19, a projection unit 2a, and an image capturing unit 3a. In these components, the projection unit 2a has the same function as the projection device 2 described above, and the image capturing unit 3a has the same function as the image capturing device 3 described above. Even in this embodiment, the processor 11 realizes the processing unit 30 as described with reference to FIG. 5. The configuration of the processing unit 30 is also the same as that in the above embodiment. The projection device 10a acquires the number of available servings and an image used for a notification image from an external projection processing device via a wireless communication. The image may use an image stored in a memory (for example, an HDD or a flash memory) embedded in the projection device 10a.

As described above, the projection device 10a of another embodiment includes the processing unit 30 that acquires the number of available servings of a service, sets the notification image 50 corresponding to the number of available servings, and executes the projection processing for projecting the notification images 50, and the projection unit 2a that projects the notification image based on the projection processing executed by the processing unit 30. Even in this configuration, it is possible to obtain the same processing and the same effect as the configuration of the above embodiment.

The series processing described above can be executed by hardware, or can be executed by software. In other words, the functional configuration of FIG. 5 is merely an example and is not particularly limited. In other words, it is sufficient as long as the projection processing device 10 has the function capable of executing the above-described series of processing as a whole, and what kind of functional block is used to realize this function is not particularly limited to the example of FIG. 5.

Furthermore, each functional block may be implemented by hardware alone, by software alone, or by a combination of hardware and software. The functional configuration in the present embodiment is realized by a processor that executes arithmetic processing, and the processor capable of being used in the present embodiment is configured by various processing units such as a single processor, a multiprocessor, and a multicore processor, and includes a combination of these various processing units and processing circuits such as ASIC (Application Specific Integrated Circuit) and FPGA (Field-Programmable Gate Array).

In the case where the series of processing steps is executed by software, a program constituting the software is installed on a computer via a network or from a storage medium. The computer may be a computer embedded in special hardware. Alternatively, the computer may be a computer such as a general-purpose personal computer that can execute various functions when various programs are installed thereon.

A storage medium including such a program is not only configured by a removable medium that is distributed separately from the main unit of the device in order to provide the program to a user, but is also configured by a storage medium that is provided to a user as embedded in the main unit of the device. The removable medium is configured by, for example, a magnetic disk (including a floppy disk), an optical disk, or a magneto-optical disk. The optical disk is configured by, for example, a CD-ROM (Compact Disk-Read Only Memory), a DVD (Digital Versatile Disk), or a Blu-ray (registered trademark) Disc (Blue-ray disk). The optical disk is configured by, for example, an MD (Mini-Disk). Further, the storage medium that is provided to the user as embedded in the main unit of the device is configured by, for example, the ROM 12 in which a program is stored as shown in FIG. 4 or a hard disk included in the storage unit 16 shown in FIG. 4.

In this description, steps written in the program recorded on the storage medium may include not only processing that is executed sequentially in order of time but also processing that is not executed sequentially in order of time but is executed in parallel or individually.

Although some embodiments of the present disclosure have been described above, these embodiments are merely examples and is not intended to limit the technical scope of the present disclosure. The present disclosure can take various other embodiments, and various omissions, replacements, and modifications may be made without departing from the gist of the present disclosure. These embodiments and modifications are included in the scope and gist of the invention described in the description and are also included in the invention described in the claims and their equivalents.

What is claimed is:

1. A projection processing device comprising:
an image capturing device; and
a processor configured to:
acquire, from the image capturing device, a captured image of a projection surface including one or more persons;
analyze the captured image to count a number of persons currently standing in a line for a service;
determine a total number of persons who have stood in the line including persons who left the line after receiving the service;
set projection positions of a notification image to be projected onto a projection surface, a number of the projection positions set being based on a number of available servings of the service;
set a content of each notification image to be projected at the projection positions set,
wherein a first notification image content indicating availability of the service is set to be projected at a position corresponding to a person standing in the line until the total number of persons who have stood in the line, including persons who left the line after receiving the service reaches the number of available servings of the service, and
wherein, when the total number of persons who have stood in the line reaches the number of available servings of the service, a second notification image content set to be projected at a position behind a last person in the line, the second notification image content indicating that the number of available servings of the service has been reached;
stop setting the first notification image content for a person when it is determined that the person has received the service and left the line, and continue setting the second notification image content so as to follow the position behind the last person in the line as long as a person remains in the line; and
control a projection device to project each notification image at the projection positions set and having one of (i) the first notification image content, and (ii) the second notification image content.

2. The projection processing device according to claim 1, wherein the processor is configured to set the content of each notification image based on a kind of the service.

3. The projection processing device according to claim 2, wherein in setting the content of each notification image based on the kind of the service, the processor is configured to set a pattern of the notification image for each kind of the service.

4. The projection processing device according to claim 1, wherein the processor is further configured to:
after controlling the projection device to project the each notification image at the projection positions set:
acquire a captured image including the notification image projected to a predetermined projection position of the projection positions set and a person;
update the projection positions set, and update the content of each notification image to be projected at the projection positions set or both, based on a positional relationship between the notification image and the person in the captured image; and
control the projection device to project each notification image at the updated projection positions and/or having the updated content.

5. The projection processing device according to claim 4, wherein the processor is configured to change the content of each notification image to be projected at the updated projection positions set based on a change in the positional relationship between the notification image and the person in the captured image.

6. The projection processing device according to claim 1, wherein the processor is further configured to:
after controlling the projection device to project the each notification image at the projection positions set:
acquire a captured image including the each notification image projected at the projection positions set and one or more persons overlapping one or more of the each notification image projected at the projection positions set;
determine that the number of available services is more than a number of the one or more persons overlapping the one or more of the each notification image projected at the projection positions set; and
in response to determining that the number of available services is more than the number of the one or more persons overlapping the one or more of the each notification image projected at the projection positions set,
- update the set projection positions of the notification image to be projected onto the projection surface, the number of the projection positions set being one more than the number of one or more persons overlapping the one or more of the each notification image previously projected;
- update the set content of the each notification image to be projected at the updated projection positions set; and
- control the projection device to project the each notification image at the updated projection positions set and having the updated content set.

7. The projection processing device according to claim 1, wherein the processor is configured to:
- acquire a captured image including the notification image projected to a leading projection position of the projection positions set;
- determine from the captured image that a person is not detected who overlaps with the notification image projected to the leading projection position;
- in response to determining that the person is not detected who overlaps the notification image projected to the leading projection position,
  - decrease the number of available services of the service;
  - update projection positions of the notification image to be projected onto the projection surface, the number of the projection positions set being based on the decreased number of available services of the service;
  - update the content of the each notification image to be projected at the projection positions set, such that the content of the notification image previously projected onto a B-th projection position is moved to a (B-1)-th projection position, where B is an integer of 2 or more; and
  - control the projection device to project each notification image at the updated projection positions and having the updated contents.

8. The projection processing device according to claim 1, wherein the processor is configured to, in setting the projection positions of the notification image to be projected onto the projection surface, set the projection positions to positions that do not overlap with a position of a person or positions of persons on the projection surface.

9. The projection processing device according to claim 1, wherein the processor is further configured to:
- control the projection device to project two or more selection images at predetermined selection positions onto the projection surface, where each of the selection images corresponds to a customizable feature of the service;
- acquire one or more captured images including the two or more selection images;
- determine the one or more captured images includes a person passing through one or more of the predetermined selection positions; and
- in response to determining the one or more captured images includes the person passing through the one or more of the predetermine selection positions, set a customization of the service to be ordered by the person.

10. The projection processing device according to claim 9,
wherein in setting the content of each notification image to be projected at the projection positions set, the processor is further configured to set the content of a notification image to include image of the customization of the service to be ordered by the person.

11. The projection processing device according to claim 1, wherein the processor is configured to control the projection device to project an additional information image showing information that is different from the content of the each notification image.

12. The projection processing device according to claim 1,
wherein the first notification image content is distinguishable from the second notification image content.

13. The projection processing device according to claim 1,
wherein in controlling the projection device, the processor is configured to control the projection device to simultaneously project each notification image at the projection positions set and having one of (i) the first notification image content, and (ii) the second notification image content.

14. The projection processing device according to claim 13,
wherein in controlling the projection device to simultaneously project each notification image, the processor is configured to control the projection device to project a notification image having the second notification image content at a position at one edge of the projection position of a notification image having the first notification image content.

15. A non-transitory computer-readable storage medium storing a program that, when executed, causes a computer to at least perform:
- acquire, from an image capturing device, a captured image of a projection surface including one or more persons;
- analyze the captured image to count a number of persons currently standing in a line for a service;
- determine a total number of persons who have stood in the line including persons who left the line after receiving the service;
- setting projection positions of a notification image to be projected onto a projection surface, a number of the projection positions set being based on a number of available servings of the service;
- setting a content of each notification image to be projected at the projection positions set,
  - wherein a first notification image content indicating availability of the service is set to be projected at a position corresponding to a person standing in the line until the total number of persons who have stood in the line, including persons who left the line after receiving the service reaches the number of available servings of the service, and
  - wherein, when the total number of persons who have stood in the line reaches the number of available servings of the service, a second notification image content is set to be projected at a position behind a last person in the line, the second notification image content indicating that the number of available servings of the service has been reached;
- stopping setting the first notification image content for a person when it is determined that the person has received the service and left the line, and continue setting the second notification image content so as to follow the position behind the last person in the line as long as a person remains in the line; and controlling a projection device to project each notification image at the projection positions set and having one of (i) the first notification image content, and (ii) the second notification image content.

16. The non-transitory computer-readable storage medium according to claim 15, wherein, when executed, the program causes the computer to perform:

after controlling the projection device to project the each notification image at the projection positions set:
acquiring a captured image including the notification image projected to a predetermined projection position of the projection positions set and a person;
updating the projection positions set, and updating the content of each notification image to be projected at the projection positions set or both, based on a positional relationship between the notification image and the person in the captured image; and
controlling the projection device to project each notification image at the updated projection positions and/or having the updated content.

17. A projection method comprising:

acquiring, from an image capturing device, a captured image of a projection surface including one or more persons;

analyzing the captured image to count a number of persons currently standing in a line for a service;

determining a total number of persons who have stood in the line including persons who left the line after receiving the service;

setting projection positions of a notification image to be projected onto a projection surface, a number of the projection positions set being based on a number of available servings of the service;

setting a content of each notification image to be projected at the projection positions set, wherein a first notification image content indicating availability of the service is set to be projected at a position corresponding to a person standing in the line until the total number of persons who have stood in the line, including persons who left the line after receiving the service reaches the number of available servings of the service, and wherein, when the total number of persons who have stood in the line reaches the number of available servings of the service, a second notification image content is set to be projected at a position behind a last person in the line, the second notification image content indicating that the number of available servings of the service has been reached;

stopping setting the first notification image content for a person when it is determined that the person has received the service and left the line, and continue setting the second notification image content so as to follow the position behind the last person in the line as long as a person remains in the line; and controlling a projection device to project each notification image at the projection positions set and having one of (i) the first notification image content, and (ii) the second notification image content.

18. The projection method according to claim 17, further comprising:

after controlling the projection device to project the each notification image at the projection positions set:
acquiring a captured image including the notification image projected to a predetermined projection position of the projection positions set and a person;
updating the projection positions set, and updating the content of each notification image to be projected at the projection positions set or both, based on a positional relationship between the notification image and the person in the captured image; and
controlling the projection device to project each notification image at the updated projection positions and/or having the updated content.

* * * * *